(12) United States Patent
Takamura et al.

(10) Patent No.: US 8,036,700 B2
(45) Date of Patent: Oct. 11, 2011

(54) MOBILE COMMUNICATION SYSTEM AND MOBILE TERMINAL

(75) Inventors: Kenichiro Takamura, Shinagawa (JP); Rongcai Hu, Beijing (CN); Manabu Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 989 days.

(21) Appl. No.: 11/924,848

(22) Filed: Oct. 26, 2007

(65) Prior Publication Data

US 2008/0090561 A1   Apr. 17, 2008

Related U.S. Application Data

(63) Continuation of application No. PCT/JP2005/008213, filed on Apr. 28, 2005.

(51) Int. Cl.
*H04M 1/00* (2006.01)
(52) U.S. Cl. ............ 455/550.1; 455/450; 455/515; 370/328
(58) Field of Classification Search .......... 455/550.1, 455/450, 515; 370/328
See application file for complete search history.

(56) References Cited

U.S. PATENT DOCUMENTS

| 6,256,509 B1 * | 7/2001 | Tanaka et al. ............ 455/515 |
| 6,314,300 B1 * | 11/2001 | Nakashima et al. ....... 455/517 |

FOREIGN PATENT DOCUMENTS

| JP | 11-178073 | 7/1999 |
| JP | 11-355846 | 12/1999 |
| JP | 2000-253460 | 9/2000 |
| JP | 2001-245345 | 9/2001 |
| JP | 2003-219482 | 7/2003 |

OTHER PUBLICATIONS

International Search Report dated Aug. 30, 2005 in corresponding PCT Application No. PCT/JP2005/008213 (2 pages).
International Preliminary Report on Patentability dated Nov. 8, 2007 in corresponding PCT Application No. PCT/JP2005/008213 (6 pages).

* cited by examiner

*Primary Examiner* — Danh Le
(74) *Attorney, Agent, or Firm* — Fujitsu Patent Center

(57) ABSTRACT

A mobile communication system comprise: a reception unit receiving data from a mobile terminal having a phone call function via a common channel being a communication channel through which a plurality of mobile terminals receive data; a storage unit storing data received by the reception unit and an identifier of the mobile terminal serving as a transmission source of the data in association with each other; and an answer unit reading, when a phone call device having a phone call function makes a call to the mobile terminal, the data stored in the storage unit in association with the mobile terminal serving as a call destination to send a response based on the data to the phone call device.

13 Claims, 16 Drawing Sheets

FIG. 11

A DISASTER HAS OCCURRED.
NETWORK CONGESTION MAY
PREVENT PHONE CALL FROM
BEING CONNECTED.
EMERGENCY INFORMATION CAN
BE LEFT IN SERVER WHEN
"YES" IS SELECTED.
DO YOU WISH TO LEAVE
EMERGENCY INFORMATION?

| YES | NO |

— 14c

DO YOU WISH ANSWERING
INFORMATION TO BE
AUTOMATICALLY SENT?
☐ 1 : 03-1234-5678
☐ 2 : 03-1234-XXXX
☐ 3 : 03-1234-XXXX

| YES | NO |

— 1c

— 15

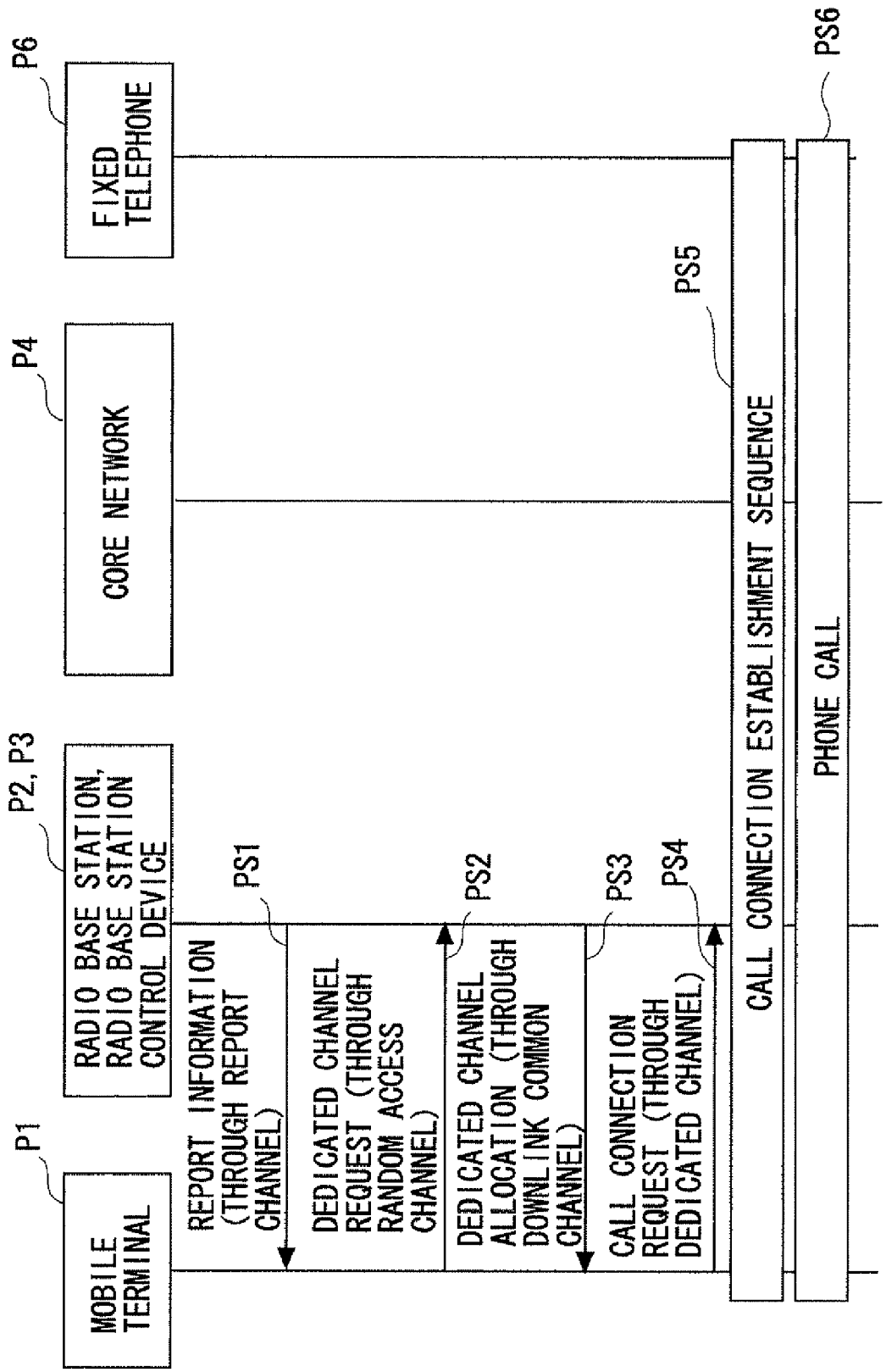

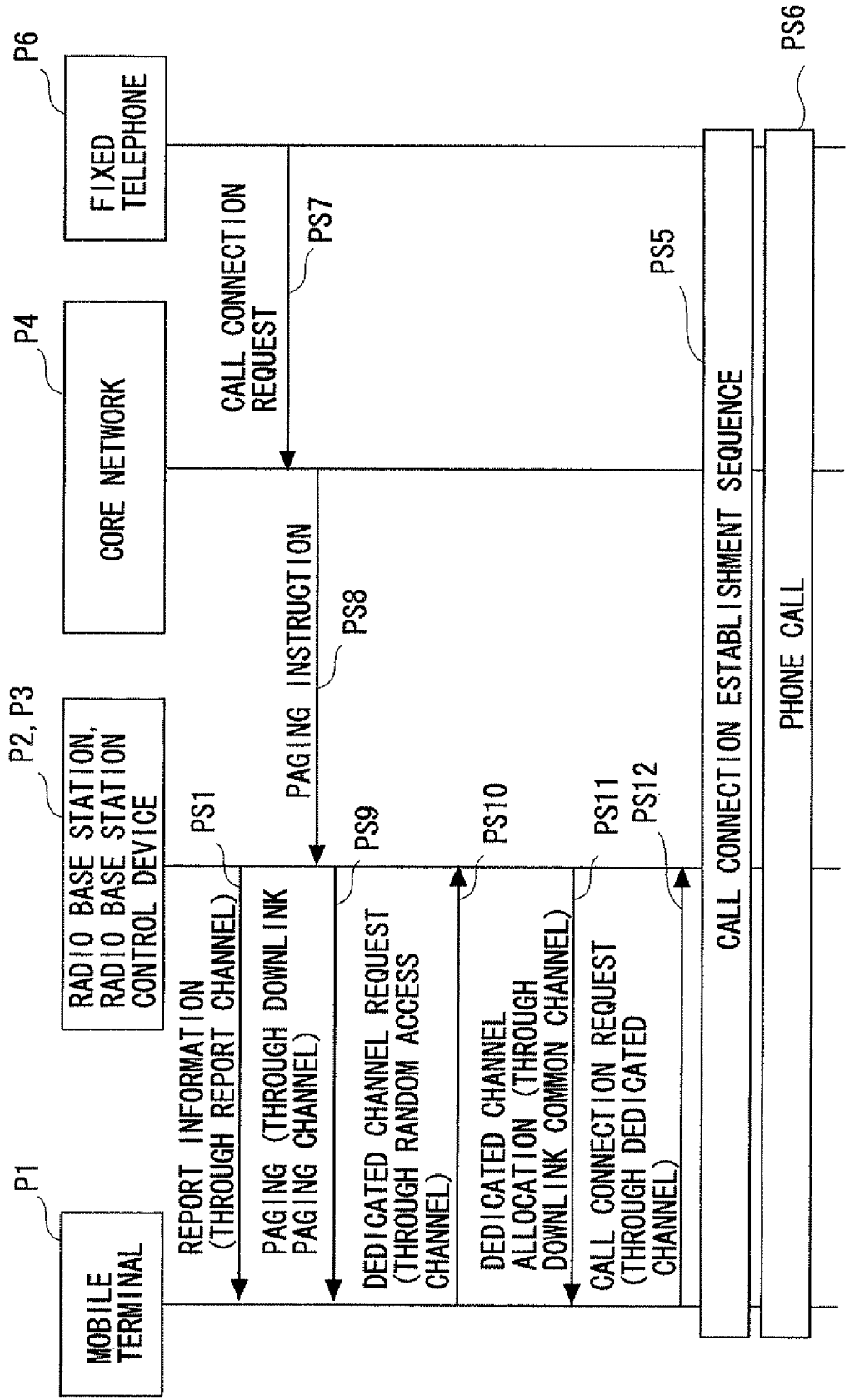

MOBILE COMMUNICATION SYSTEM AND MOBILE TERMINAL

CROSS-REFERENCE TO RELATED APPLICATION

This is a continuation of Application PCT/JP2005/008213, filed on Apr. 28, 2005, now pending, the contents of which are herein wholly incorporated by reference.

BACKGROUND OF THE INVENTION

1. Field of the Invention

The present invention relates to an effective technique to be applied to a mobile communication system in which congestion may occur, a device used in the system, and a method executed in the device.

2. Description of the Related Art

Cellular phones have been widely used and have attracted attentions as a system used to make sure the safety of peoples in a disaster area when disaster or the like occurs. FIG. 14 is a diagram showing a configuration example of a mobile communication system. Mobile terminals P1 communicate with a radio base station P2 by using radio channels. The radio base station P2 is connected to a radio base station control device P3 and controlled by the radio base station control device P3. The radio base station control device P3 is connected to a core network P4, whereas the core network P4 is connected to a fixed telephone P6 via a fixed telephone network P5.

The radio base station P2 can use only limited given radio resources. The radio channels can be classified into common channels and dedicated channels according to intended uses thereof. Further, the radio channels can be classified into uplink channels and downlink channels according to the communication directions. The limited radio resources are divided and allocated to uplink common channels, uplink dedicated channels, downlink common channels, and downlink dedicated channels. The dedicated channels are special channels, each of which is to be allocated to each mobile terminal when necessary. Specific examples of the downlink common channels include a report channel and a paging channel. Specific example of the uplink common channel includes a random access channel.

FIG. 15 is a diagram showing a procedure example performed when the mobile terminal P1 makes a call to the fixed telephone P6. Described above of horizontally-extending arrows shown in FIG. 15 are information, instruction, or processing to be conveyed, respectively, from the start to the end of the arrow. In FIG. 15, a channel to be used to send the information is described in parentheses.

First, the radio base station control device P3 sends, via the radio base station P2, information on the radio base station P2 (report information) and the like to all the mobile terminals P1 (in FIG. 14, the two mobile terminals P1) by using the report channel, which is one of the downlink common channels (PS1). In an off-hook state, the mobile terminal P1 requests a dedicated channel to perform a call connection procedure based on the received reporting information by using the random access channel, which is one of the uplink common channels (PS2). When there are still sufficient radio resources left, the radio base station control device P3 sends information on dedicated channel allocation, to the mobile terminal P1 via the radio base station P2 by using a downlink common channel (PS3). Upon reception of the information, the mobile terminal P1 uses a dedicated channel which has been allocated, to send a call connection request to the radio base station control device P3 (PS4). Then, the mobile terminal P1 performs a call connection establishment procedure (call connection establishment sequence) (PS5) to allow a phone call to be connected between the mobile terminal P1 and the fixed telephone P6 (PS6).

FIG. 16 is a diagram showing a procedure example performed when the fixed telephone P6 makes a call to the mobile terminal P1, which is contrary to the case of FIG. 15. The mobile terminal P1 receives report information from the radio base station P2 and the radio base station control device P3 as in the case of FIG. 15 (PS1). The fixed telephone P6 first issues a call connection request (PS7). When the call connection request is received by the core network P4 via the fixed telephone network P5, the core network P4 instructs appropriate radio base station P2 and radio base station control device P3 to page the mobile terminal P1 (PS8). Upon reception of the instruction, the radio base station P2 and the radio base station control device P3 page the mobile terminal P1 by using the paging channel, which is one of the downlink common channels (PS9) The mobile terminal P1, which has been paged, requests a dedicated channel to perform a call connection procedure, by using the random access channel (PS10). If there are radio resources left, the radio base station P2 and the radio base station control device P3 send information on dedicated channel allocation, to the mobile terminal P1 by using a downlink common channel (PS11). Upon reception of the information, the mobile terminal P1 uses a dedicated channel which has been allocated, to send a call connection request to the radio base station control device P3 (PS12). Then, the mobile terminal P1 performs a call connection establishment procedure (call connection establishment sequence) (PS13) to allow a phone call to be connected between the mobile terminal P1 and the fixed telephone P6 (PS14).

Patent Document 1: JP 11-178073 A
Patent Document 2: JP 2000-253460 A

However, in the conventional system described above, a problem occurs when an excessive congestion occurs at a time of disaster. Specifically, at a time of disaster, the users of mobile terminals in the disaster area may simultaneously make calls to contact their families and acquaintances, and their families and acquaintances may also simultaneously make calls to the users of mobile terminals in the disaster area to make sure of the safety of them. In this case, an excessive congestion occurs in mobile communication networks (such as cellular phone networks and PHS networks) of the disaster area, leading to a situation in which the calls are not connected.

As a technology for solving the problem, a radio connection system has been proposed, in which urgent information of a subscriber is notified to the call destination even when all radio communication channels are being used (see Patent Document 1). In this system, when a phone call cannot be connected between the subscriber and a center device, a base station sends, to the center device, information indicating that this is an urgent call from an important subscriber. However, in the system, the center device is just notified that the urgent call has been made from the particular subscriber, but the subscriber cannot send desired information to the center device. In addition, the subscriber cannot send information to desired users (such as relatives and friends of the subscriber) either.

For making calls to emergency numbers, such as 110 and 119, special radio resources are reserved. Therefore, even when a general congestion as described above has occurred, calls to those numbers can be connected. Another technology has been proposed in which, while all communication slots of radio channels are being used, when an urgent call is additionally made from a mobile terminal, a radio base station allocates a slot which has been used as a control slot, to a communication slot for the urgent call, to allow the urgent call to be connected to the police or the fire department (see Patent Document 2). However, when outgoing and incoming calls use up the resources, it becomes impossible to make a call in the same way as with other conventional technologies. Thus, as in Patent Document 1, the user cannot send desired information to a desired user.

SUMMARY OF THE INVENTION

Therefore, an purpose of the present invention is to provide a device and a method capable of contacting others by using a mobile terminal even in an area where an excessive congestion has occurred.

Hereinafter, the problem inherent in the conventional technologies will be discussed. To make or receive a call using a mobile terminal, even when congestion such as the congestion described above has occurred, the mobile terminal can perform up to the operation of requesting a dedicated channel by using the random access channel (the operation corresponding to PS2, PS10) shown in FIGS. 15, 16. However, the radio base station control device P3 cannot allocate a dedicated channel because the radio resources are insufficient. Accordingly, the subsequent operations are not performed, and as a result, the mobile terminal cannot make or receive a call. Therefore, in the conventional mobile communication systems, because the mobile terminal cannot make or receive a call in an area where an excessive congestion has occurred (for example, in a disaster area), it is impossible to contact a user of the mobile terminal, for example, in order to make sure the safety of the user of the mobile terminal.

In a situation where congestion such as that described above has occurred, a call can be desirably connected. However, even when a call cannot be connected in such a situation, there are demands for at least making sure of the personal safety. The present invention meets such demands by allowing notification of small amount of information even when the excessive congestion has occurred in a network of a mobile communication system. Therefore, the present invention is configured as follows.

(First Aspect)

A first aspect of the present invention provides a mobile communication system including a reception unit, a storage unit, and an answer unit. The reception unit receives data from a mobile terminal having a phone call function through a common channel which is a communication channel that can be used by multiple mobile terminals for reception. The storage unit stores the data received by the reception unit and an identifier of the mobile terminal serving as the transmission source of the data in association with each other. The answer unit reads, when a phone call device having a phone call function makes a call to the mobile terminal, the data stored in the storage unit in association with the mobile terminal serving as the call destination, and answers the phone call device based on the data.

According to the mobile communication system having the configuration of the first aspect of the present invention, even in a state where a phone call service cannot be provided through the dedicated channel, the reception unit can receive data through the common channel from the mobile terminal having the phone call function. In other words, the mobile terminal used in the mobile communication system can send data through the common channel even in a state where a phone call cannot be connected through the dedicated channel. Then, in the mobile communication system, answering is performed for the phone call device which has made a call to the mobile terminal based on the data received from the mobile terminal as described above. As a result, for example, even in a state where a phone call cannot be connected between the phone call device and the mobile terminal because the excessive network congestion has occurred, it is possible to notify an answer based on the data sent from the mobile terminal, to the phone call device. Therefore, the user of the mobile terminal can notify data that includes his or her message to a desired communication party (the user of the phone call device) even when the phone call using the mobile terminal cannot be connected.

The mobile communication system according to the first aspect of the present invention may be configured to further includes an allocation unit and a notification unit. The allocation unit allows, by allocating a dedicated channel, which is a dedicated communication channel to the mobile terminal, speech communication using the mobile terminal through the dedicated channel. The notification unit notifies, in a state where the allocation unit cannot allocate the dedicated channel to the mobile terminal, notification indicating that the dedicated channel cannot be allocated to the mobile terminal, to the multiple mobile terminals through the common channel. In this case, the reception unit may be configured to receive the data through the common channel from the mobile terminals to which the notification has been sent from the notification unit.

According to the mobile communication system having the configuration of the first aspect of the present invention, the mobile terminal can understand, from the notification sent from the notification unit, that speech communication cannot be performed. In this case, when the mobile terminal displays the notification, the user of the mobile terminal can understand that speech communication cannot be performed. In other words, the user can understand that, even when another person has made a call for speech communication to the mobile terminal, the mobile terminal may be unable to receive the call, and a call cannot be made to the phone call device of another person by using the mobile terminal. The user of the mobile terminal can notify data which includes a message indicating the situation where speech communication cannot be performed or indicating the safety of the user, to the user of another phone call device, as described above. If there is no notification from the notification unit, this may prevent the user from understanding that even when another person has made a call for speech communication to the mobile terminal, the mobile terminal may be unable to receive the call. In such a case, because the user of the phone call device cannot contact the user of the mobile terminal, the user of the phone call device may have worry about the safety of the user of the mobile terminal. Further, to avoid such a situation, it is effective for the mobile communication system to include the notification unit.

The mobile communication system according to the first aspect of the present invention may be configured to further include a call connection establishment unit and a control unit. The call connection establishment unit establishes, when the phone call device makes a call to the mobile terminal, a call connection between the mobile terminal and the phone call device. The control unit causes the answer unit to perform the answering when the phone call device makes a call to the mobile terminal in the state where the allocation unit cannot allocate the dedicated channel to the mobile terminal, and causes the allocation unit to perform the allocation and further causes the call connection establishment unit to establish the call connection when the phone call device makes a call to the mobile terminal in a state where the allocation unit can allocate the dedicated channel to the mobile terminal.

According to the mobile communication system having the configuration of the first aspect of the present invention, when the phone call device makes a call to the mobile terminal, the control unit determines whether the allocation unit can allocate the dedicated channel to the mobile terminal. When the allocation unit can allocate the dedicated channel to the mobile terminal, the allocation unit and the call connection establishment unit establish a call connection to be able to perform speech communication between the mobile terminal and the phone call device. On the other hand, when the allocation unit cannot allocate the dedicated channel to the mobile terminal, the answer unit, instead of the mobile terminal serving as the call destination, performs answering based on the data stored (registered) in advance in the storage unit by the mobile terminal serving as the call destination. Therefore, it is possible to prevent the answer unit from unnecessarily performing answering even while speech communication can be performed. Similarly, it is also possible to prevent a situation where the call connection establishment is performed but fails even while speech communication cannot be performed.

The mobile communication system according to the first aspect of the present invention may be configured to further include a notification destination storage unit that stores an identifier indicating the mobile terminal and an identifier indicating the phone call device in association with each other. The identifier may be an ID or a telephone number which has been assigned to the terminal in advance. With this configuration, the answer unit may perform answering only when the identifier indicating the phone call device, serving as the call source, has been stored in the notification destination storage unit in association with the identifier indicating a mobile terminal serving as the call destination.

According to the mobile communication system having the configuration of the first aspect of the present invention, unless the phone call device serving as the call source and the mobile terminal serving as the call destination have been associated with each other in advance, answering based on the data stored in the storage unit may not be performed for the phone call device serving as the call source. Therefore, it is possible to prevent answering from being performed for unspecified number of phone call devices, and to protect the privacy of the data registered in the storage unit by the mobile terminal. When the phone call device serving as the call source and the mobile terminal serving as the call destination have not been associated with each other in advance, answering which is not based on the data stored in the storage unit (typical answering such as "message is not available") may be performed.

The notification destination storage unit of the first aspect of the present invention may be configured to store the identifier indicating the mobile terminal, an identifier indicating the phone call device, and an identifier indicating the data to be stored in the storage unit in association with each other. In this case, only when the identifier indicating the phone call device serving as the call source has been stored in the notification destination storage unit in association with the identifier indicating the mobile device serving as the call destination and the identifier indicating the data to be stored in the storage unit, the answer unit may be configured to perform the answering by using the data indicated by the identifier indicating the data.

According to the mobile communication system having the configuration of the first aspect of the present invention, answering is performed based on data which has been registered in association with each phone call device serving as the call source. Even in a mobile communication system which is configured to perform answering only when the identifier indicating the phone call device serving as the call source has been stored in the notification destination storage unit in association with the identifier indicating the mobile device serving as the call destination, the privacy can be protected as described above. However, according to the mobile communication system of the present invention, the privacy can be further securely protected and the level of convenience is also improved. Specifically, when the user of the mobile terminal wishes to contact multiple users of phone call devices, the user of the mobile terminal does not necessarily wish to tell the same message to all of the users. In this case, because it is possible to perform answering based on data prepared for the user of each phone call device, the privacy of the data (for example, message content) used for the answering can be protected and the level of convenience is improved.

The notification destination storage unit of the first aspect of the present invention may be configured to store, when a registration request is received as well as an identifier indicating a desired phone call device from the mobile terminal, the identifier indicating the mobile terminal and the received identifier indicating the phone call device in association with each other. Further, the notification destination storage unit of the first aspect of the present invention may be configured to store, when an identifier indicating a desired phone call device is received along with the data from the mobile terminal, the identifier indicating the mobile terminal and the received identifier indicating the phone call device in association with each other. Further, the notification destination storage unit of the first aspect of the present invention may be configured to store, when the identifier indicating a desired phone call device is received along with the data from the mobile terminal, the identifier indicating the mobile terminal, the received identifier indicating the phone call device, and the identifier indicating the received data in association with each other.

In the above-described mobile communication system according to the first aspect of the present invention, unless the phone call device makes a call to the mobile terminal, answering is not performed based on data registered in the storage unit by the mobile terminal. However, in actuality, the user of the mobile terminal may wish to voluntarily (actively) perform notification to the user of the phone call device. To settle such an issue, the mobile communication system according to the first aspect of the present invention may be configured to include an automatic transmission unit which allows, when an instruction to actively perform answering for the phone call device is received along with data from the mobile terminal, the answer unit to perform answering for the phone call device regardless of whether the phone call device has made a call or not. In this case, the answer unit may be configured to perform answering after the automatic transmission unit establishes a condition where answering can be performed.

According to the mobile communication system having the configuration of the first aspect of the present invention, the answer unit performs answering for a specified phone call device regardless of whether the phone call device has made a call or not. Therefore, even when the user of the phone call device has not made a call, the user of the mobile terminal can notify a desired message to the user of the phone call device.

The mobile communication system according to the first aspect of the present invention may be configured to include a mobile terminal, a radio base station, a radio base station control device, and a core network. The radio base station performs radio communication with the mobile terminal. The radio base station may include the reception unit. The radio base station control device controls the radio base station. The radio base station control device may include a transmission unit that sends the data received by the reception unit to the storage unit of the core network. The core network is a network for connecting a radio network including the radio base station and the radio base station control device to another network so as to be able to perform communication. The storage unit and the answer unit may be connected with each other in the core network.

(Second Aspect)

A second aspect of the present invention is a mobile terminal having a phone call function. The mobile terminal of the second aspect of the present invention is used in the mobile communication system of the first aspect of the present invention. The mobile terminal of the second aspect of the present invention includes an input unit and a transmission unit. The input unit is operated by the user to generate data indicating a desired message. The transmission unit sends the data generated by the input unit to the reception unit through the common channel. With the use of the mobile terminal having the configuration, the user can register data in the storage unit in the mobile communication system of the first aspect described above.

The mobile terminal of the second aspect of the present invention may be configured to further include a reception unit and a display unit. The reception unit receives notification from the notification unit through the common channel. When the notification is received, the display unit displays an expression to prompt the user to input a desired message. In this case, when the display unit displays the expression to prompt the user to input a desired message, the input unit may be configured to allow the user to input a desired message.

The display unit of the second aspect of the present invention may be configured to further display an expression to prompt the user to specify a phone call device for which answering is actively performed. In this case, when the display unit displays the expression to prompt the user to specify a phone call device, the input unit may be configured to allow the user to specify a phone call device. Further, in this case, the transmission unit may send the identifier of the phone call device along with data.

(Other)

The first aspect of the present invention may be realized when an appropriate program is executed by an information processor. Specifically, in the present invention, the processing performed by each of the above-described unit of the first aspect can be specified as a program to be executed by the information processor or can be specified as a recording medium having the program recorded. Further, in the present invention, the processing performed by each of the above-described unit may be specified as a method to be executed by the information processor.

Similarly, the second aspect of the present invention may be realized when a program is executed by a mobile terminal having a phone call function. Specifically, in the present invention, the processing performed by each of the above-described unit of the second aspect can be specified as a program to be executed by the mobile terminal or can be specified as a recording medium having the program recorded. Further, in the present invention, the processing performed by each of the above-described unit may be specified as a method to be executed by the above-described mobile terminal.

According to the present invention, the user of the mobile terminal can notify data which includes a message of the user to a desired communication party even when a phone call using the mobile terminal cannot be connected. Therefore, even in an area where an excessive congestion has occurred, it is possible to contact another person by using the mobile terminal.

BRIEF DESCRIPTION OF THE DRAWINGS

FIG. 11 is a diagram showing an external appearance example of the mobile terminal when disaster information and automatic transmission information are received.

FIG. 15 is a diagram showing a procedure example performed when a mobile terminal makes a call to a fixed telephone in the conventional mobile communication system.

FIG. 16 is a diagram showing a procedure example performed when the fixed telephone makes a call to the mobile terminal in the conventional mobile communication system.

EXPLANATION OF MARKS

P1 MOBILE TERMINAL
P2 RADIO BASE STATION
P3 RADIO BASE STATION CONTROL DEVICE
P4 CORE NETWORK
P5 FIXED TELEPHONE NETWORK
P6 FIXED TELEPHONE
1a, 1b, 1c MOBILE TERMINAL
2 RADIO BASE STATION
3 RADIO BASE STATION CONTROL DEVICE
4a, 4b, 4c CORE NETWORK
5 FIXED TELEPHONE NETWORK

6 FIXED TELEPHONE
7 DISASTER INFORMATION REPORT UNIT
8 EMERGENCY INFORMATION RECEPTION UNIT
9 EMERGENCY INFORMATION STORAGE UNIT
10a, 10b, 10c EMERGENCY CONTROL UNIT
11 EMERGENCY INFORMATION PROVIDING UNIT
12a, 12c EMERGENCY CONTROL UNIT
13 DISASTER INFORMATION RECEPTION UNIT
14a, 14c DISASTER INFORMATION DISPLAY UNIT
15 EMERGENCY INFORMATION INPUT UNIT
16 EMERGENCY INFORMATION TRANSMISSION UNIT
17 AUTOMATIC-ANSWERING MANAGEMENT UNIT
18 AUTOMATIC-TRANSMISSION MANAGEMENT UNIT
100a, 100b, 100c MOBILE COMMUNICATION SYSTEM

DETAILED DESCRIPTION

First Embodiment (System Configuration)

Figure 1:
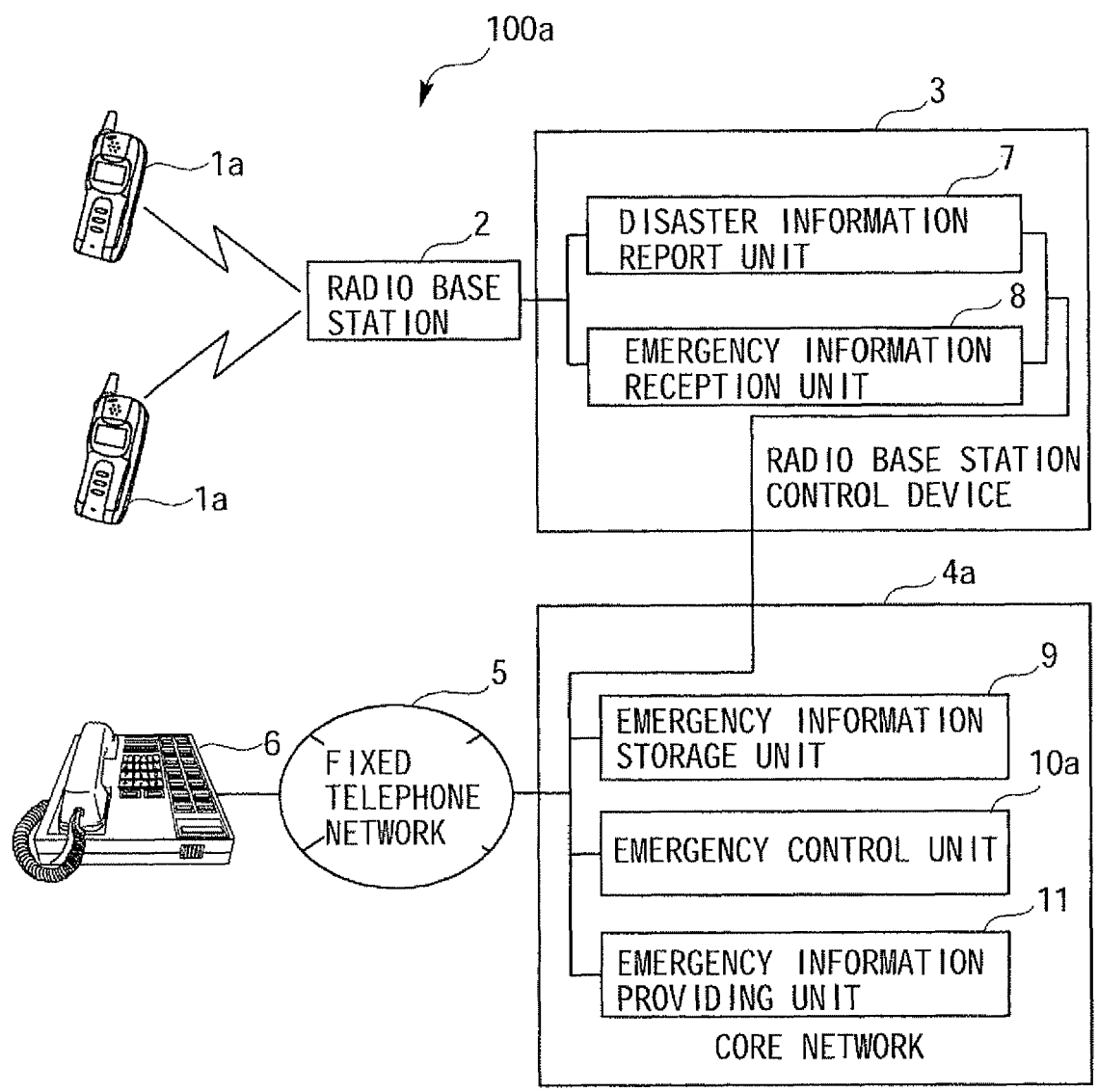
FIG. 1 is a diagram showing a configuration example of a mobile communication system according to a first embodiment.

First, a description is given of a configuration example of a mobile communication system according to a first embodiment. FIG. 1 is a diagram showing a configuration example of a mobile communication system 100a corresponding to the first embodiment of the present invention. The mobile communication system 100a includes multiple mobile terminals 1a, a radio base station 2, a radio base station control device 3, a core network 4a, a fixed telephone network 5, and a fixed telephone 6. Although a description is given of the devices hereinafter, the mobile terminals 1a will be lastly described for convenience of explanation. Since the radio base station 2, the fixed telephone network 5, and the fixed telephone 6 have the same configurations as conventional ones, a description thereof is omitted.

The radio base station control device 3 is connected to one or more radio base stations 2 (actually, to devices provided for the radio base stations 2) so as to be able to perform communication, and controls the radio base stations 2. The radio base station control device 3 is configured by newly adding a disaster information report unit 7 and an emergency information reception unit 8 to a radio base station control device which has been conventionally used. For example, the radio base station control device 3 includes, as hardware components, a central processing unit (CPU), a main memory (RAM), an auxiliary memory, and a network interface, all of which are connected to each other via a bus. The auxiliary memory is configured by using a nonvolatile memory unit.

The disaster information report unit 7 and the emergency information reception unit 8 may be realized, for example, when a new program for realizing the disaster information report unit 7 and the emergency information reception unit 8 is executed in addition to a program operated in the radio base station control device which has been conventionally used. Alternatively, the disaster information report unit 7 and the emergency information reception unit 8 may be configured by using dedicated hardware and added to the radio base station control device which has been conventionally used.

The disaster information report unit 7 sends, upon reception of notification of emergency from the core network 4a, disaster information on the disaster and usual report information to each of the mobile terminals 1a via the radio base station 2 through a report channel.

The emergency information reception unit 8 sends, upon reception of emergency information from a mobile terminal 1a through a random access channel, the received emergency information to the core network 4a. The emergency information unit that the user of the mobile terminal 1a wishes to give a notice to some people (who may be specified people or unspecified people) in case of emergency at which a phone call can be hardly connected. The emergency information may indicate that, for example, the person who sends the emergency information is safe, sending food, clothes, or the like by mail is desired, and the person, who sends the emergency information, and his/her family have settled in a secure place. Specifically, the emergency information is configured by data indicating multiple characters, numbers, and the like.

The core network 4a is configured by using lines for connecting connection points of an Internet service provider (ISP), lines for connecting the provider to another provider and to a provider-provider interconnection point, and a device for connecting and controlling these lines. The core network 4a is configured by newly adding an emergency information storage unit 9, an emergency control unit 10a, and an emergency information providing unit 11 to a device which has been used in a conventional core network. For example, the device provided in the core network 4a includes, as hardware components, a central processing unit (CPU), a main memory (RAM), an auxiliary memory, and a network interface, and the like, all of which are connected to each other via a bus. The auxiliary memory is configured by using a nonvolatile memory unit.

The emergency information storage unit 9, the emergency control unit 10a, and the emergency information providing unit 11 may be realized, for example, when a new program for realizing the emergency information storage unit 9, the emergency control unit 10a, and the emergency information providing unit 11 is executed in addition to a program operated in the device which has been used in the conventional core network. Alternatively, the emergency information storage unit 9, the emergency control unit 10a, and the emergency information providing unit 11 may be configured by using dedicated hardware and added to the device which has been used in the conventional core network.

The emergency information storage unit 9 associates emergency information sent from the radio base station control device 3 to the core network 4a, with the mobile terminal 1a which has sent the emergency information, and stores the emergency information. For example, the emergency information storage unit 9 may associate the emergency information with the telephone number assigned to the mobile terminal 1a which has sent the emergency information, and store the emergency information and the telephone number.

The emergency control unit 10a causes, upon detection of emergency, the core network 4a to be in an emergency state. The emergency control unit 10a detects emergency when an administrator inputs that emergency has occurred or when emergency is detected by an emergency detecting device, for example. The emergency detecting device may be a device for detecting a disaster such as a seismic intensity meter or a rain gauge. After the state of the core network 4a is changed to the emergency state, the emergency control unit 10a sends disaster information to the radio base station control device 3. The mobile terminal 1a displays, upon reception of the disaster information, a message of "A disaster has occurred. Network congestion may prevent a phone call from being connected. Emergency information can be left in the server when "Yes" is selected. Do you wish to leave emergency information?," for example. An operation example of the mobile terminal 1a performed when disaster information is received will be described later.

Upon reception of a call from the fixed telephone 6 to the mobile terminal 1a in the emergency state, the emergency control unit 10a performs emergency answering processing. As the emergency answering processing, the emergency control unit 10a instructs the emergency information providing unit 11 to perform emergency answering.

After the state of the core network 4a is changed to the emergency state, the emergency information providing unit 11 answers, instead of the mobile terminal 1a, an incoming call destined for the mobile terminal 1a which is an emergency control target. When emergency information associated with the mobile terminal 1a is stored in the emergency information storage unit 9, the emergency information providing unit 11 reads the emergency information and answers using the emergency information. The emergency information providing unit 11 provides emergency information to the fixed telephone 6 by reading the emergency information by voice, for example.

The mobile terminal 1a performs radio communication with the radio base station 2. Then, the mobile terminal 1a realizes a phone call with the fixed telephone 6 via the radio base station 2, the radio base station control device 3, the core network 4a, and the fixed telephone network 5. The mobile terminal 1a is configured by using a device which has a radio communication function, such as a cellular phone and a personal handyphone system (PHS), for example.

Figure 2:
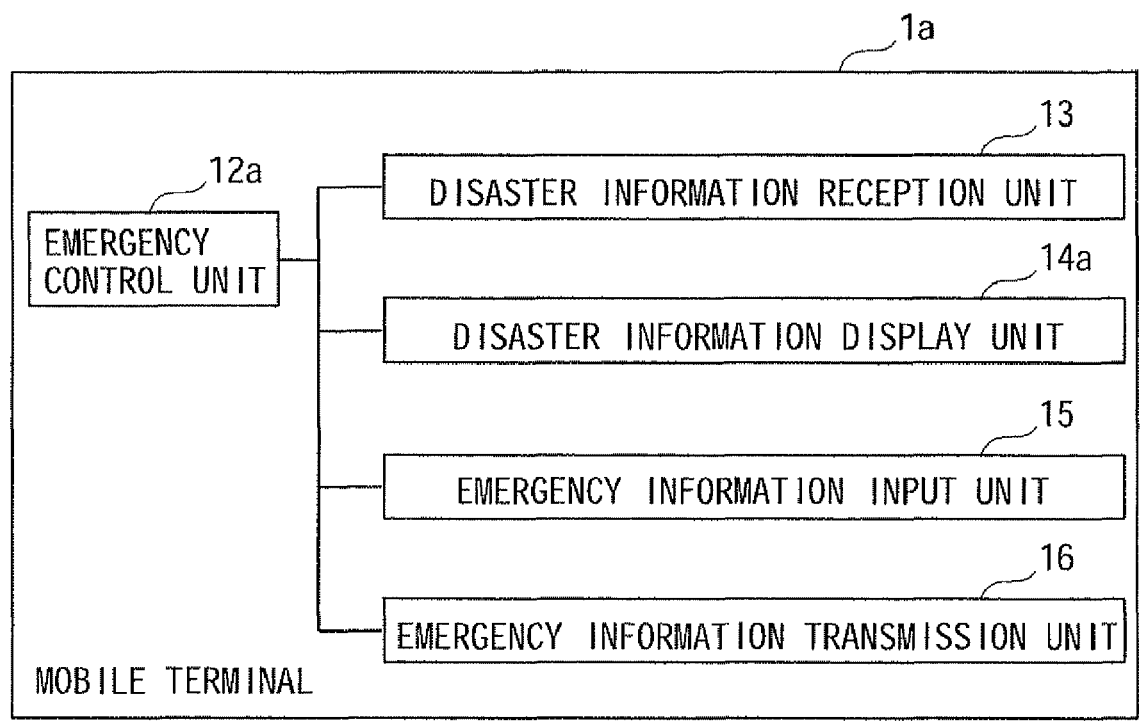
FIG. 2 is a diagram showing a function block example of a mobile terminal according to the first embodiment.

FIG. 2 is a diagram showing a function block example of the mobile terminal 1a. The mobile terminal 1a functions as a device which includes an emergency control unit 12a, a disaster information reception unit 13, a disaster information display unit 14a, an emergency information input unit 15, and an emergency information transmission unit 16, when various programs (such as an OS and an application) stored in an auxiliary memory are loaded to a main memory and executed by a CPU. The emergency control unit 12a is realized when the CPU executes the corresponding program. The emergency control unit 12a may be configured as a dedicated IC chip.

Next, each of the function units included in the mobile terminal 1a will be described. Note that the emergency control unit 12a of the mobile terminal 1a and the emergency control unit 10a of the core network are different function units.

When the disaster information reception unit 13, described later, receives disaster information, the emergency control unit 12a changes the state of the mobile terminal 1a to an emergency state. Further, the emergency control unit 12a instructs the disaster information display unit 14a to display a message or the like corresponding to the received disaster information. When emergency information is inputted by the user via the emergency information input unit 15, the emergency control unit 12a instructs the emergency information transmission unit 16 to send the inputted emergency information to the core network 4a.

The disaster information reception unit 13 is realized by using a radio communication function included in a conventional mobile terminal device. The disaster information reception unit 13 receives disaster information through a report channel used for radio communication. Upon reception of the disaster information, the disaster information reception unit 13 notifies the emergency control unit 12a that the disaster information has been received.

Figure 3:
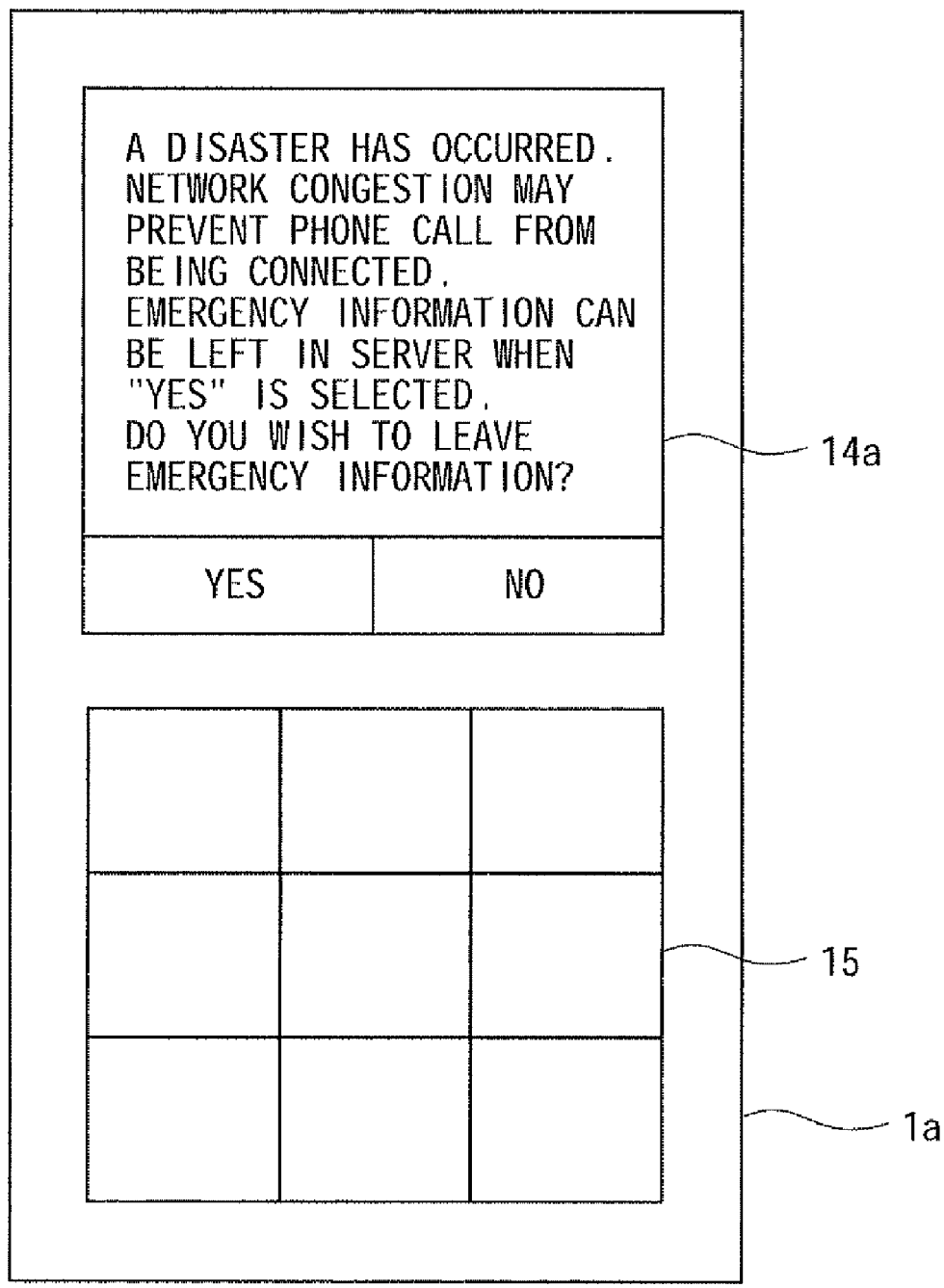
FIG. 3 is a diagram showing an external appearance example of the mobile terminal when disaster information is received.

The disaster information display unit 14a is configured by using a display device such as a liquid crystal display device and an organic electro-luminescent (EL) display device. The disaster information display unit 14a displays a message or the like corresponding to disaster information, in response to an instruction sent from the emergency control unit 12a. FIG. 3 is a diagram showing an external appearance example of the mobile terminal 1a when disaster information is received. The disaster information display unit 14a displays a message of "A disaster has occurred. Network congestion may prevent a phone call from being connected. Emergency information can be left in the server when "Yes" is selected. Do you wish to leave emergency information?," for example. The disaster information display unit 14a may be configured to display "Yes" and "No" at positions corresponding to input buttons associated with "Yes" and "No," at the same time as when displaying the message.

The emergency information input unit 15 is configured by using an input device such as a keyboard, buttons, a dial input device, and a touch panel. The emergency information input unit 15 may be configured by using an input device included in a conventional mobile terminal device. The user can select information or input a message by operating the emergency information input unit 15. In FIG. 3, the emergency information input unit 15 is configured with nine buttons arranged in a 3×3 matrix. For example, when the mobile terminal 1a is configured by using a cellular phone, the emergency information input unit 15 is configured by using a general-purpose input device (buttons used to input telephone numbers and characters) used in the cellular phone.

The emergency information transmission unit 16 is realized by using a radio communication function included in a conventional mobile terminal device. After an instruction to send emergency information is received from the emergency control unit 12, the emergency information transmission unit 16 sends, by radio communication, emergency information input by the user via the emergency information input unit 15.

(Operation Sequence of Mobile Communication System)

Figure 4:
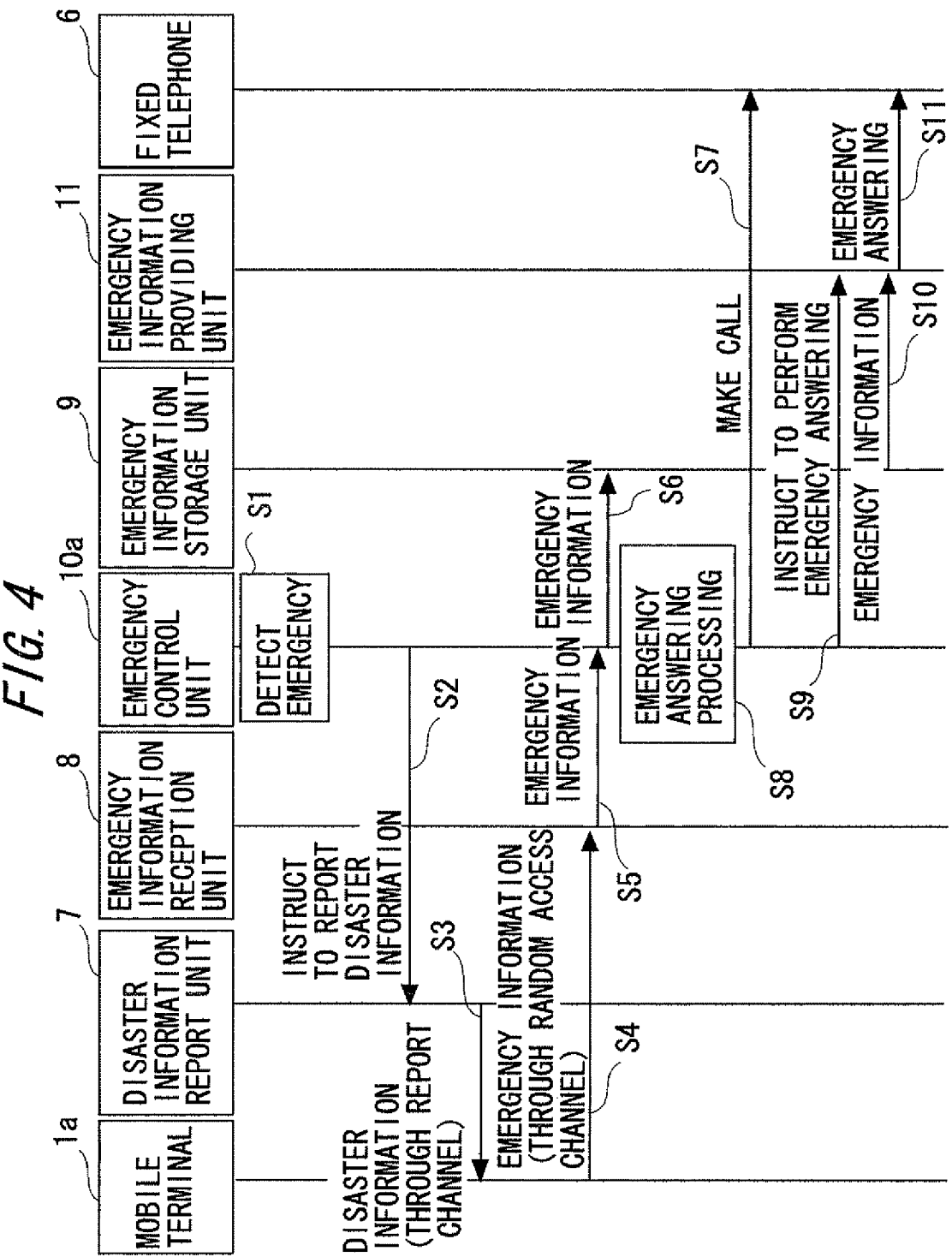
FIG. 4 is a diagram showing an operation sequence example of the mobile communication system according to the first embodiment.

FIG. 4 is a diagram showing an operation sequence example of the mobile communication system 100a. Next, a description is given of an operation sequence of the mobile communication system 100a which includes the radio base station control device 3, the core network 4a, and the mobile terminals 1a. Note that the operation sequence to be described below is an operation sequence example of the mobile communication system 100a. In other words, the operation of the mobile communication system 100a is not limited to the following description.

After the emergency control unit 10a detects an emergency (S1), the core network 4a shifts to an emergency state. The emergency control unit 10a instructs the disaster information report unit 7 to report disaster information to each of the terminals 1a (S2). Upon reception of the instruction, the disaster information report unit 7 sends usual report information and disaster information to each mobile terminal 1a through the report channel (S3).

Figure 5:
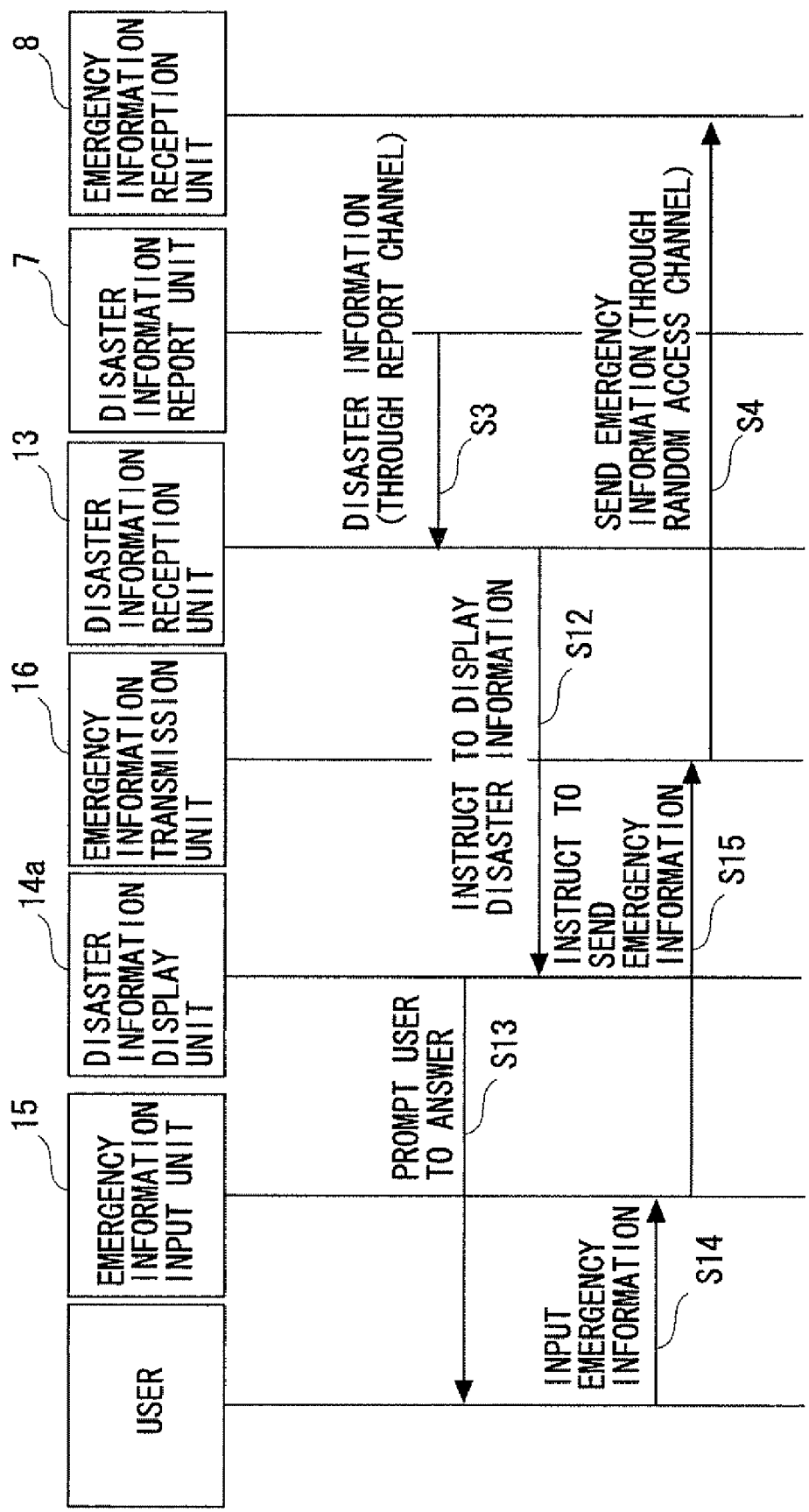
FIG. 5 is a diagram showing an operation example of the mobile terminal according to the first embodiment.

FIG. 5 is a diagram showing an operation example of the mobile terminal 1a when disaster information is received. When the disaster information is sent from the disaster information report unit 7 through the report channel, the disaster information reception unit 13 of the mobile terminal 1a receives the disaster information. After the disaster information reception unit 13 receives the disaster information, the emergency control unit 12a instructs the disaster information display unit 14a to display a message corresponding to the received disaster information (S12). Based on the instruction, the disaster information display unit 14a displays a message as shown in FIG. 3, for example, to prompt the user to input emergency information (S13). After viewing the message corresponding to the disaster information, the user of the mobile terminal 1a notices that network congestion may prevent a phone call using the mobile terminal 1a from being connected. In other words, the user of the mobile terminal 1a notices that even when the user's family, friends, or acquaintances have made calls to the user, the mobile terminal 1a of the user may be unable to receive the calls. If the user of the mobile terminal 1a wishes to tell those people at least that the user is safe, the user can input emergency information by operating the emergency information input unit 15 (S14). For example, after reading the message (see FIG. 3) corresponding to the disaster information, the user of the mobile terminal 1a can press the button corresponding to "Yes" and input a message as emergency information.

After the emergency information is input via the emergency information input unit 15, the emergency control unit 12a instructs the emergency information transmission unit 16 to send the emergency information (S15). Then, the emergency information transmission unit 16 sends the emergency information input by the user, to the emergency information reception unit 8 through the random access channel (S4).

Referring back to FIG. 4, upon reception of the emergency information from the mobile terminal 1a through the random access channel (S4), the emergency information reception unit 8 sends the emergency information and the identifier of the mobile terminal 1a which has sent the emergency information, to the emergency control unit 10a of the core network 4a (S5). The telephone number may be used as the identifier. Alternatively, another identifier (identifier assigned in the mobile communication system 100a) may be applied. Upon reception of the emergency information, the emergency control unit 10a associates the identifier of the mobile terminal 1a, the reception time, and the emergency information with one another and causes the emergency information storage unit 9 to store the identifier of the mobile terminal 1a, the reception time, and the emergency information (S6). The operation sequence performed until the emergency information is recorded in the emergency information storage unit 9 has been described above.

Next, a description is given of an operation sequence performed when the emergency information recorded in the emergency information storage unit 9 is provided to the fixed telephone 6. After a call is made from the fixed telephone 6 to the mobile terminal 1a (S7), the emergency control unit 10a determines whether the core network 4a is in the emergency state. When the core network 4a is in the emergency state, the emergency control unit 10a performs emergency answering processing (S8). Specifically, the emergency control unit 10a instructs a device (not shown) included in the core network 4a to prevent a call from the fixed telephone 6 from being connected to the mobile terminal 1a. The emergency control unit 10a also instructs the emergency information providing unit 11 to perform emergency answering for the fixed telephone 6 (S9). The emergency information providing unit 11 reads, from the emergency information storage unit 9, the emergency information corresponding to the identifier of the mobile terminal 1a to which the fixed telephone 6 has made the call (S10). Then, the emergency information providing unit 11 provides the read emergency information to the fixed telephone 6 (S11).

(Operation and Effect)

In the mobile communication system 100a having such a configuration, the mobile terminal 1a can receive disaster information through the report channel and send emergency information through the random access channel. In other words, the mobile terminal 1a can receive disaster information and send emergency information only through common channels, without using any dedicated channel. Specifically, the disaster information report unit 7 can report disaster information to the mobile terminal 1a without using a dedicated channel, and the emergency information reception unit 8 can receive emergency information from the mobile terminal 1a without using a dedicated channel. Then, the emergency information received by the emergency information reception unit 8 is provided to the fixed telephone 6 in response to a call made by the fixed telephone 6. Accordingly, even in a state where dedicated channels cannot be allocated (in an emergency state, specifically, in a state where radio resources are insufficient because an excessive congestion has occurred), the user of the mobile terminal 1a can register emergency information in the core network 4a. Even when the user of the fixed telephone 6 makes a call to the mobile terminal 1a and the call cannot be connected to the mobile terminal 1a, the user of the fixed telephone 6 can obtain the emergency information registered in the core network 4a and understand the state of the user of the mobile terminal 1a.

(Modifications)

Although the mobile communication system 100a has been described on the assumption that disaster is particularly considered as an emergency case, the time of shifting to the emergency state is not necessarily limited to the time of occurrence of disaster. The mobile communication system 100a may be configured such that shifting to the emergency state is performed in another situation where congestion is assumed to occur in a radio network.

Further, the mobile communication system 100a may include a device which is not shown in FIG. 1, if necessary. For example, a switch or like may be provided between the radio base station control device 3 and the core network 4a. Further, for example, a gateway switch, a gateway device, or the like may be provided between the core network 4a and the fixed telephone network 5. In addition, the mobile communication system 100a may include a device such as a home register and an area register, if necessary.

When emergency information is recorded in the emergency information storage unit 9, the emergency information may be recorded in association with time other than the emergency information reception time, such as the time at which the emergency information is sent from the mobile terminal 1a or the time at which the emergency information is received by the emergency information reception unit 8. When time information is not particularly necessary, emergency information may be recorded in association with just the identifier of the mobile terminal 1a.

When the fixed telephone 6 has a function of receiving character information sent from the core network 4a, the emergency information providing unit 11 may provide emergency information in the form of character information to be displayed on a display of the fixed telephone 6. In this configuration, emergency information may be configured to include data of a pictographic character.

The emergency information providing unit 11 may be configured to provide emergency information after an introductory message of "It is difficult to have a connection right now because of network congestion. However, the following message is left at the date and time (hh:mm, MM DD, YY) by the customer of the telephone number you have dialed." The emergency information providing unit 11 may be configured to provide only the introductory message when it is difficult to provide emergency information because of the function of the fixed telephone 6 or the like. Even with the introductory message only, there is a case where the fact that the user of the mobile terminal 1a has left the message at that time is found out and thus the user of the fixed telephone 6 recognizes that the user of the mobile terminal 1a is safe (alive).

When cancellation of registered emergency information is input via the emergency information input unit 15, the emergency control unit 12a may instruct the emergency information transmission unit 16 to send a cancellation request to cancel the registered emergency information, to the emergency information reception unit 8. In this case, the emergency information reception unit 8 sends, to the core network 4a, the cancellation request and the identifier of the mobile terminal 1a which has sent the cancellation request. The emergency information storage unit 9 deletes the emergency information stored in association with the identifier which has been received together with the cancellation request.

Second Embodiment (System Configuration)

Next, a configuration example of a mobile communication system according to a second embodiment will be described. In the second embodiment of the present invention, when registering emergency information, the user of a mobile terminal 1b can specify the user of the fixed telephone 6 (actually, the fixed telephone 6) so that the user of the fixed telephone 6 can obtain the emergency information.

Figure 6:
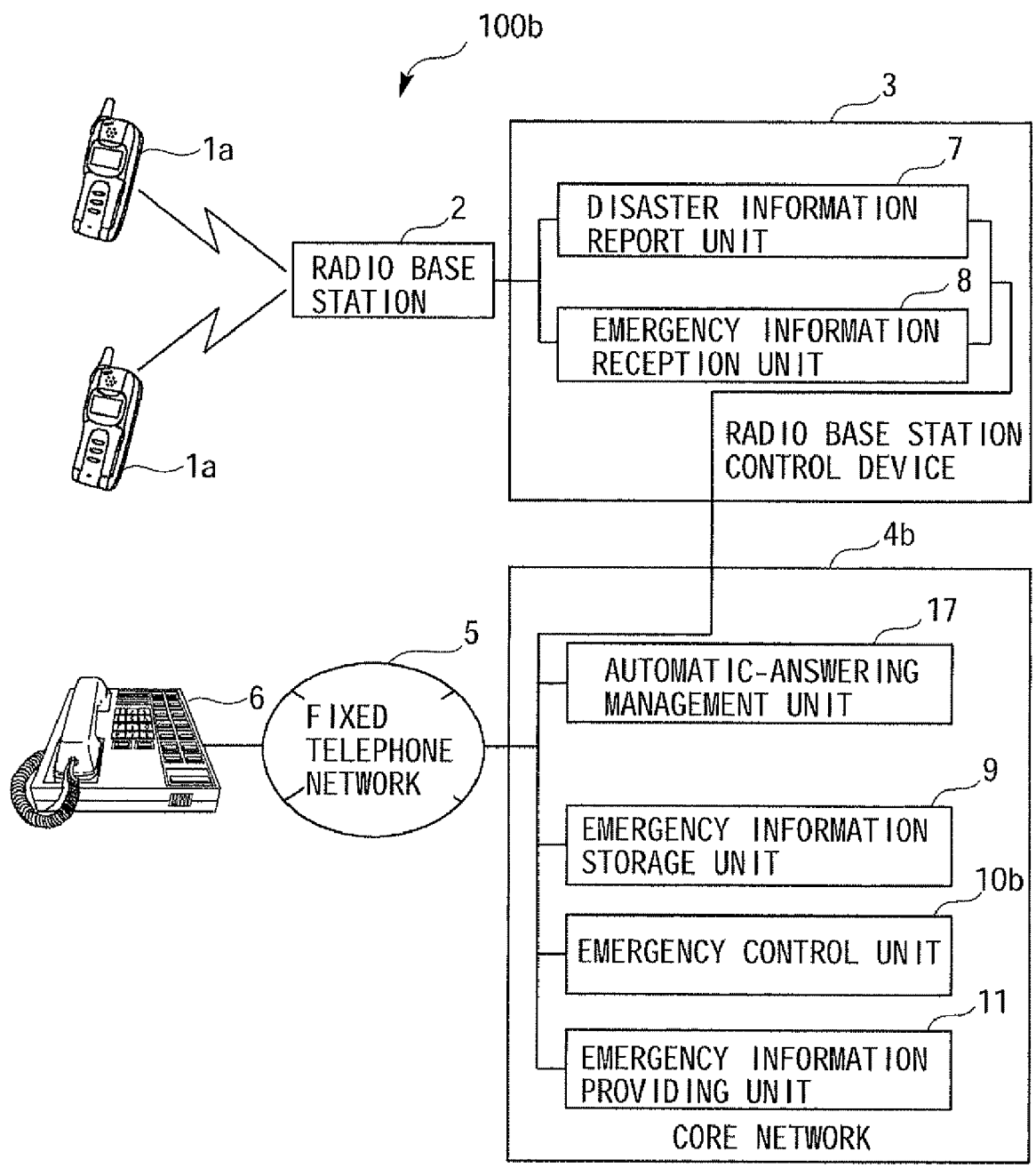
FIG. 6 is a diagram showing a configuration example of a mobile communication system according to a second embodiment.

FIG. 6 is a diagram showing a configuration example of a mobile communication system 100b corresponding to the second embodiment of the present invention. The mobile communication system 100b differs from the mobile communication system 100a in which the mobile communication system 100b includes a core network 4b in place of the core network 4a. Hereinafter, a description is given to points where the mobile communication system 100b is different from the mobile communication system 100a.

The core network 4b differs from the core network 4a in which the core network 4b includes an automatic-answering management unit 17 and also includes an emergency control unit 10b in place of the emergency control unit 10a. Hereinafter, a description is given to points where the core network 4b is different from the core network 4a.

The automatic-answering management unit 17 stores, in a storage device (not shown), the identifier of the mobile terminal 1a and the identifier of the fixed telephone 6 in association with each other. The telephone number may be used as the identifier. Another identifier may be applied. If a registration request is received from the emergency control unit 10b, the automatic-answering management unit 17 stores two identifiers (the identifier of the mobile terminal 1a and the identifier of the fixed telephone 6) included in the registration request in association with each other. Further, when a confirmation request is received from the emergency control unit 10b, the automatic-answering management unit 17 determines whether two identifiers (the identifiers of the mobile terminal 1a and the fixed telephone 6) included in the confirmation request have been registered in association with each other. Then, the automatic-answering management unit 17 passes a result of the determination, as a confirmation answer, to the emergency control unit 10b.

If a registration request is received from the mobile terminal 1a, the emergency control unit 10b passes the registration request to the automatic-answering management unit 17. When a call is made by the fixed telephone 6 in an emergency state, the emergency control unit 10b performs emergency answering processing. Hereinafter, the emergency answering processing of the second embodiment will be described.

The emergency control unit 10b passes a confirmation request which includes the identifier of the fixed telephone 6 and the identifier of the mobile terminal 1a of the call destination, to the automatic-answering management unit 17. When a confirmation answer is received from the automatic-answering management unit 17, the emergency control unit 10b determines whether to provide emergency information, depending on the content of the confirmation answer. Specifically, when the content of the confirmation answer indicates that the mobile terminal 1a and the fixed telephone 6 both concerning the confirmation request have been registered in association with each other, the emergency control unit 10b instructs the emergency information providing unit 11 to provide emergency information. On the other hand, when the content of the confirmation answer indicates that the mobile terminal 1a and the fixed telephone 6 both concerning the confirmation request have not been registered in association with each other, the emergency control unit 10b instructs the emergency information providing unit 11 to provide an error message. The error message is a message indicating that emergency information has not been registered, a message indicating that emergency information cannot be provided to the fixed telephone 6, or other messages. For example, the error message may be a message of "There is no message from the cellular phone of the telephone number you have dialed" or a message of "A message from the cellular phone you have called is not available to your telephone."

(Operation Sequence of Mobile Communication System)

Figure 7:
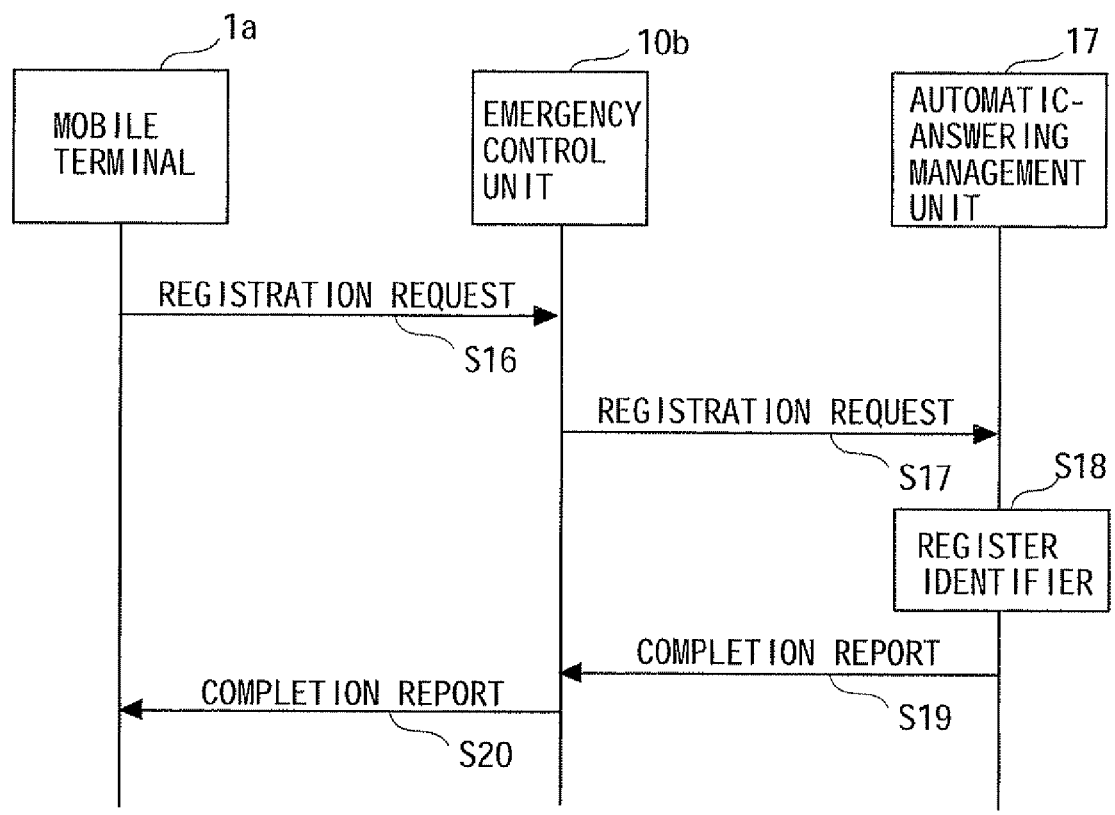
FIG. 7 is a diagram showing an operation sequence example of the mobile communication system according to the second embodiment.

FIG. 7 is a diagram showing an operation sequence example performed in the mobile communication system 100b when an association between the mobile terminal 1a and the fixed telephone 6 is registered. In the mobile communication system 100b, the user of the mobile terminal 1a can specify in advance the fixed telephone 6 with which emergency information registered by the mobile terminal 1a can be obtained, regardless of whether it is an emergency state or not. This specifying processing is realized as the following. First, the user of the mobile terminal 1a inputs the identifier of a desired fixed telephone 6 and instructs the mobile terminal 1a to send a registration request. The mobile terminal 1a incorporates the identifier of the fixed telephone 6 input by the user into the registration request, and sends the registration request to the emergency control unit 10b (S16).

Upon reception of the registration request from the mobile terminal 1a, the emergency control unit 10b passes the registration request to the automatic-answering management unit 17 (S17). At this time, the emergency control unit 10b passes at least the identifier of the mobile terminal 1a which is the transmission source of the received registration request and the identifier of the fixed telephone 6 included in the registration request, to the automatic-answering management unit 17. After the identifier of the mobile terminal 1a and the identifier of the fixed telephone 6 are received as the registration request from the emergency control unit 10b, the automatic-answering management unit 17 registers those two identifiers in association with each other (S18). The automatic-answering management unit 17 notifies a completion report to the emergency control unit 10b (S19), and the emergency control unit 10b also notifies the completion report to the mobile terminal 1a (S20).

Figure 8:
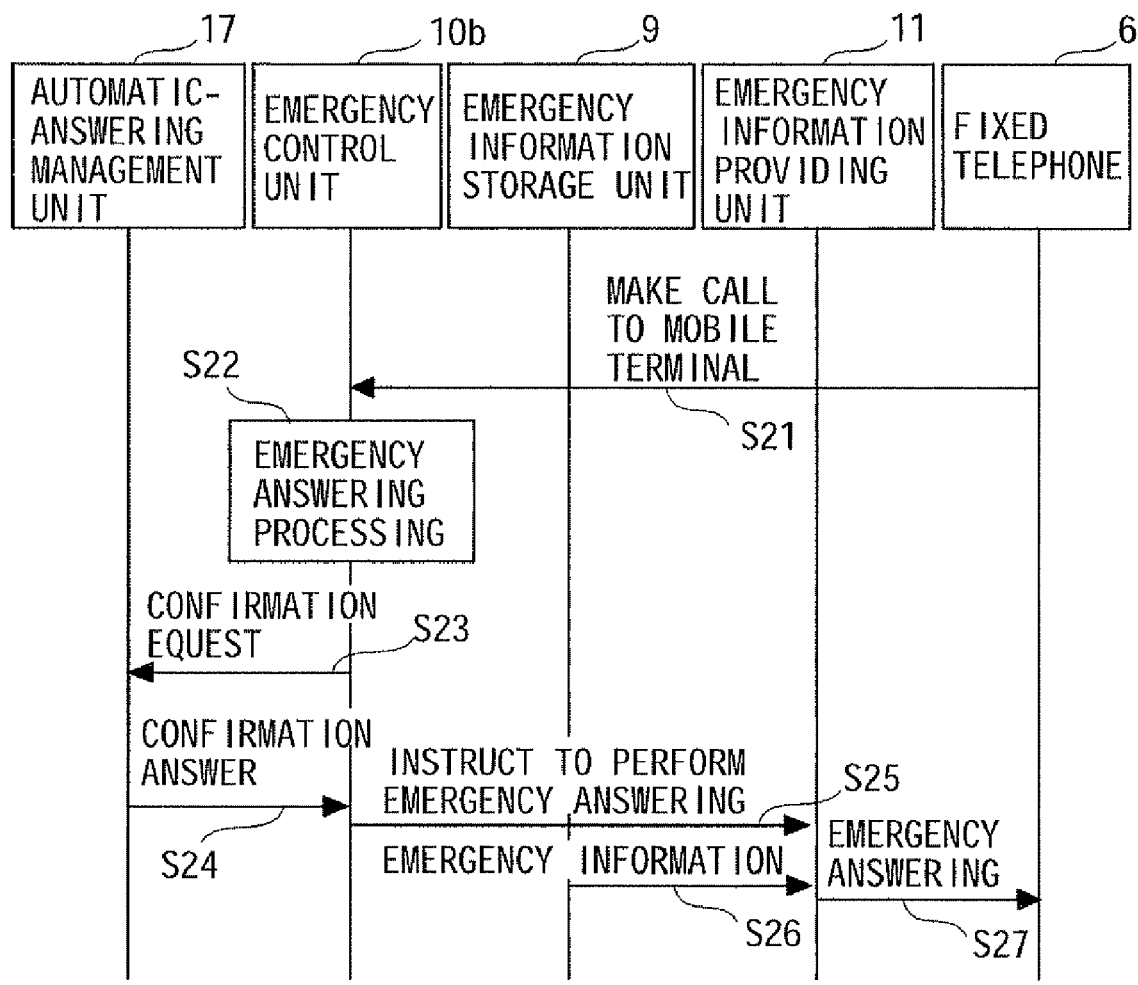
FIG. 8 is a diagram showing an operation sequence example of the mobile communication system according to the second embodiment.

FIG. 8 is a diagram showing an operation sequence example of the mobile communication system 100b when emergency answering processing is performed. In the mobile communication system 10b, because the operation to be performed from the detection of emergency to the registration of emergency information is basically the same as that in the mobile communication system 10a, a description thereof is omitted.

When a call is made from the fixed telephone 6 to the mobile terminal 1a (S21), the emergency control unit 10b performs emergency answering processing (S22). As the emergency answering processing, the emergency control unit 10b sends a confirmation request to the automatic-answering management unit 17 (S23). Upon reception of the confirmation request, the automatic-answering management unit 17 determines whether two identifiers (the identifier of the mobile terminal 1*a* and the identifier of the fixed telephone 6) included in the confirmation request have been registered in association with each other. The automatic-answering management unit 17 passes a result of the judgment, as a confirmation answer, to the emergency control unit 10*b* (S24).

When the confirmation answer includes an affirmative judgment result, the emergency control unit 10*b* issues an instruction to perform emergency answering, to the emergency information providing unit 11 (S25). Upon reception of the instruction to perform emergency answering, the emergency information providing unit 11 reads, from the emergency information storage unit 9, emergency information corresponding to the identifier of the mobile terminal 1*a* included in the emergency answering instruction (S26). The emergency information providing unit 11 performs emergency answering for the fixed telephone 6 by using the read emergency information (S27).

(Operation and Effect)

In the mobile communication system 100*a*, even when any fixed telephone 6 makes a call to the mobile terminal 1*a*, emergency information registered from the mobile terminal 1*a* is equally provided (i.e., emergency answering is performed). In this case, it is hard to say that the privacy of the emergency information is protected. To deal with this issue, in the mobile communication system 100*b*, the mobile terminal 1*a* and the fixed telephone 6 are associated with each other, and emergency answering is performed only to the particular fixed telephone 6 based on the association. For example, only a fixed telephone 6 which has been registered in advance can make sure of a message from the user of the mobile terminal 1*a*. Accordingly, the privacy of the emergency information registered by the mobile terminal 1*a* can be protected.

(Modifications)

Identifiers may be registered in the automatic-answering management unit 17 at the same time as when emergency information is registered. In this case, the user of the mobile terminal 1*a* inputs emergency information and also the identifier of the fixed telephone 6 in the mobile terminal 1*a*. The input identifier of the fixed telephone 6 is sent to the radio base station 2 through the random access channel together with the emergency information, and then, notified to the automatic-answering management unit 17.

The automatic-answering management unit 17 may be configured to associate with each other and store the identifier indicating emergency information to be stored in the emergency information storage unit 9, the identifier of the fixed telephone 6, and the identifier of the mobile terminal 1*a*. With such configuration, when sending emergency information to the core network 4*b*, the mobile terminal 1*a* can also send the identifier of the fixed telephone 6 corresponding to the emergency information, in association therewith. After such emergency information is received, the emergency information storage unit 9 generates an identifier indicating the emergency information at the time of storing the emergency information, and stores this identifier and the emergency information in association with each other. The emergency information storage unit 9 passes this identifier, the identifier of the fixed telephone 6, and the identifier of the mobile terminal 1*a* to the automatic-answering management unit 17. The automatic-answering management unit 17 stores the three identifiers in association with each other. When a call is made to the mobile terminal 1*a*, the emergency information providing unit 11 reads, from the emergency information storage unit 9, the emergency information corresponding to the identifier of the fixed telephone 6 which has made the call and the identifier of the mobile terminal 1*a* to which the call has been made, and performs emergency answering for the fixed telephone 6. With this configuration, the user of the mobile terminal 1*a* can notify each of the users of multiple fixed telephones 6 of different emergency information. In other words, the user of the mobile terminal 1*a* can securely send, to the users of the multiple fixed telephones 6, emergency information prepared for each of the users of the fixed telephones 6. At this time, information (the identifier of emergency information, the identifier of the mobile terminal 1*a*, and the identifier of the fixed telephone 6) to be stored in the automatic-answering management unit 17 may be configured to be stored in the emergency information storage unit 9. In this case, the automatic-answering management unit 17 is not necessary.

In a case where the core network 4*b* has not been shifted to the emergency state when a registration request is sent, the registration request may be sent through a common channel or a dedicated channel. On the other hand, in a case where the core network 4*b* has been shifted to the emergency state when a registration request is sent, the registration request is desirably sent through a common channel. Further, a registration request may be sent from a terminal device other than the mobile terminal 1*a* through the Internet. Further, a registration request may be sent by postcard and input to the emergency control unit 10*b* by a human.

When cancellation of the registration of a fixed telephone 6 serving as the notification destination of emergency information is input via the emergency information input unit 15, the emergency control unit 12*a* may instruct the emergency information transmission unit 16 to send a cancellation request to cancel the registration of the fixed telephone 6, to the emergency information reception unit 8. In this case, the emergency information reception unit 8 sends the cancellation request and the identifier of the mobile terminal 1*a* which has sent the cancellation request, to the core network 4*b*. The emergency control unit 10*b* instructs the automatic-answering management unit 17 to delete the association between the identifier of the fixed telephone 6 included in the cancellation request and the identifier of the mobile terminal 1*a* which has sent the cancellation request.

Third Embodiment (System Configuration)

Next, a configuration example of a mobile communication system according to a third embodiment will be described. In the third embodiment of the present invention, when the user of a mobile terminal 1*c* registers emergency information, the emergency information is spontaneously sent to the fixed telephone 6 regardless of whether a call is made from the fixed telephone 6 to the mobile terminal 1*c*.

Figure 9:
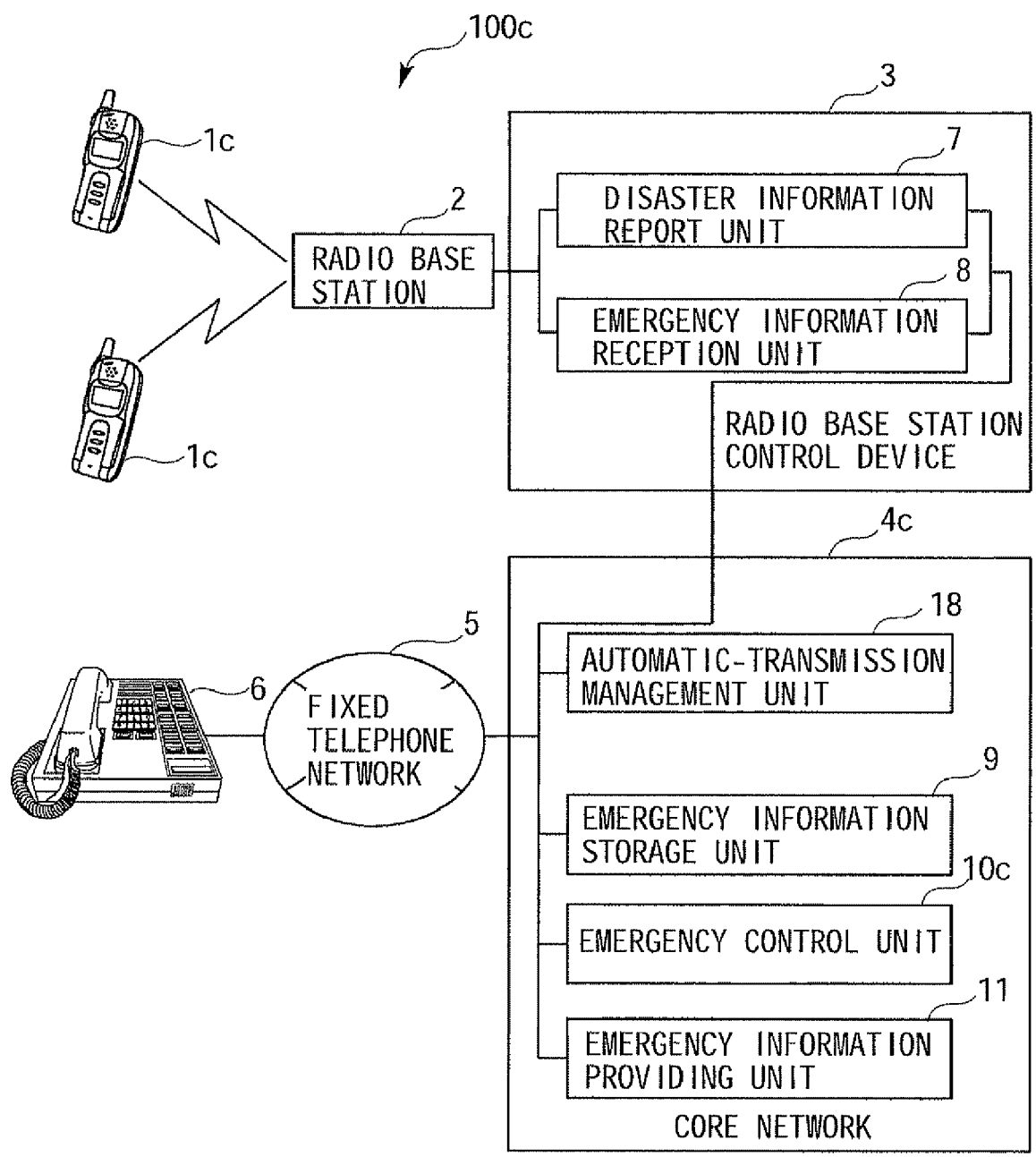
FIG. 9 is a diagram showing a configuration example of a mobile communication system according to a third embodiment.

FIG. 9 is a diagram showing a configuration example of a mobile communication system 100*c* according to the third embodiment of the present invention. The mobile communication system 100*c* differs from the mobile communication system 100*a* in that the mobile communication system 100*c* includes multiple mobile terminals 1*c* in place of the multiple mobile terminals 1*a* and also includes a core network 4*c* in place of the core network 4*a*. Hereinafter, a description is given to points where the mobile communication system 100*c* is different from the mobile communication system 100*a*.

The core network 4*c* differs from the core network 4*a* in that the core network 4*c* includes an automatic-transmission management unit 18 and also includes an emergency control unit 10*c* in place of the emergency control unit 10*a*. Hereinafter, a description is given to points where the core network 4*c* is different from the core network 4*a*.

The automatic-transmission management unit 18 may be realized, for example, when a new program for realizing the automatic-transmission management unit 18 is executed in addition to a program operated in a device which has been used in a conventional core network. Alternatively, the automatic-transmission management unit 18 may be configured by using special hardware and added to a device which has been used in the conventional core network.

The automatic-transmission management unit 18 realizes automatic transmission processing. The automatic transmission processing indicates processing of automatically sending emergency information registered by the mobile terminal 1c to the notification destination (fixed telephone 6) associated with the emergency information. Specifically, when the identifier of a fixed telephone 6 are sent from the mobile terminal 1c along with emergency information, the automatic-transmission management unit 18 sends the emergency information to the fixed telephone 6 corresponding to the identifier. After a connection to the fixed telephone 6 is established and the emergency information is ready to be sent to the fixed telephone 6, the automatic-transmission management unit 18 notifies this condition to the emergency control unit 10c.

The emergency control unit 10c instructs the disaster information report unit 7 to send automatic transmission information along with disaster information. The automatic transmission information indicates that automatic transmission processing is being performed by the automatic-transmission management unit 18 in the core network 4c. The automatic transmission information is generated by the emergency control unit 10c or the automatic-transmission management unit 18, after the emergency control unit 10c makes an inquiry to the automatic-transmission management unit 18. When emergency information is registered by the mobile terminal 1c, the emergency control unit 10c passes the emergency information and the identifier of the fixed telephone 6 included in the emergency information to the automatic-transmission management unit 18 and instructs the automatic-transmission management unit 18 to perform automatic transmission processing. Upon reception of the notice indicating that a connection to the fixed telephone 6 has been established from the automatic-transmission management unit 18, the emergency control unit 10c instructs the emergency information providing unit 11 to provide the emergency information to the fixed telephone 6.

Figure 10:
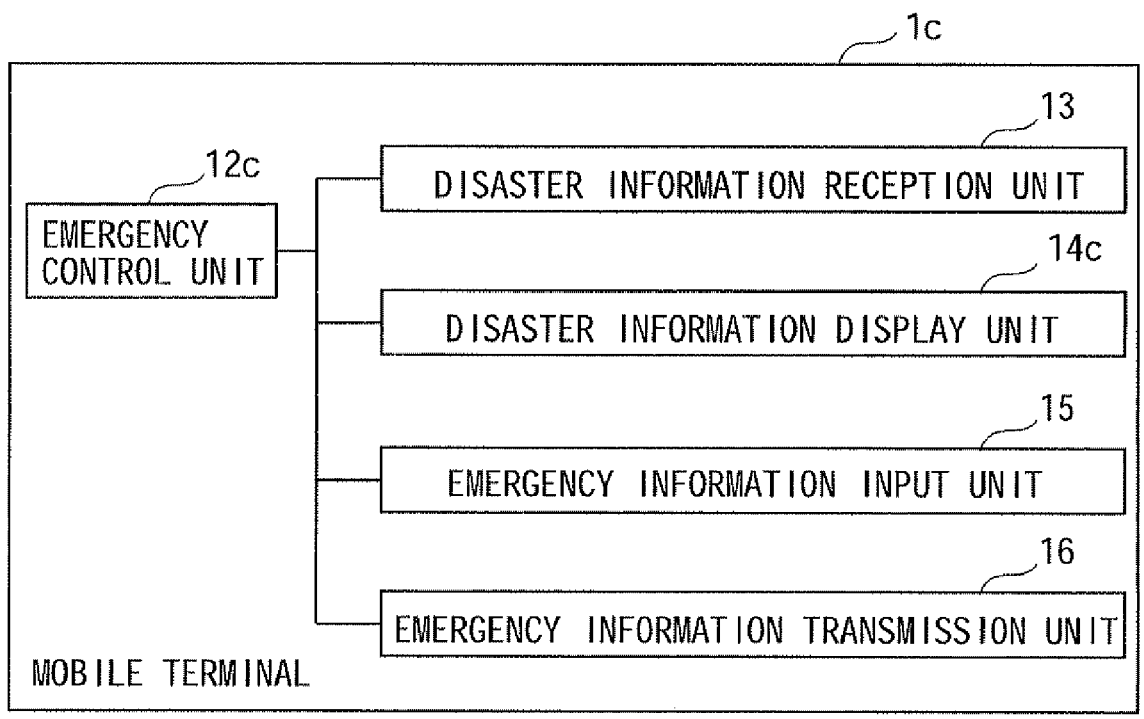
FIG. 10 is a diagram showing a function block example of a mobile terminal according to the third embodiment.

FIG. 10 is a diagram showing a function block example of the mobile terminal 1c. The mobile terminal 1c differs from the mobile terminal 1a in that the mobile terminal 1c includes an emergency control unit 12c and a disaster information display unit 14c in place of the emergency control unit 12a and the disaster information display unit 14a, respectively. Hereinafter, a description is given to points where the mobile terminal 1c is different from the mobile terminal 1a.

When the disaster information reception unit 13 receives automatic transmission information along with disaster information, the emergency control unit 12c causes the disaster information display unit 14c to display a message corresponding to the automatic transmission information. The message corresponding to the automatic transmission information is a message to prompt the user to decide whether to notify emergency information to a fixed telephone 6 through automatic transmission processing, and, when notification by automatic transmission processing is decided, to select and to input a target fixed telephone 6 to which automatic transmission processing is to be applied. The message corresponding to the automatic transmission information may be a message of "Do you wish the emergency information to be sent automatically?," for example. Further, the message corresponding to the automatic transmission information may be a message of "Please input the notification destination of the emergency information" to ask to input the identifier of a desired fixed telephone 6 (for example, the telephone number of a desired fixed telephone 6). Further, the message corresponding to the automatic transmission information may be a message of "Please select the notification destination of the emergency information. 1: 03-0000-0001, 2: 03-0000-0002, 3: 03-0000-0003" to ask to select the identifier of a desired fixed telephone 6. After the notification destination of the emergency information has been input by the user, the emergency control unit 12c causes the emergency information transmission unit 16 to incorporate the identifier indicating the fixed telephone 6, which is the notification destination, into the emergency information and to send the emergency information to the automatic-transmission management unit 8.

The disaster information display unit 14c differs from the disaster information display unit 14a in that when an instruction to display the message corresponding to automatic transmission information is issued from the emergency control unit 12c, the disaster information display unit 14c displays the message. FIG. 11 is a diagram showing an external appearance example of the disaster information display unit 14c on which the messages corresponding to disaster information and automatic transmission information are displayed. The upper part of the displayed contents has the same message as that displayed on the disaster information display unit 14a of the first embodiment. On the other hand, the message corresponding to the automatic transmission information is additionally displayed in the lower part of the displayed contents.

(Operation Sequence of Mobile Communication System)

Figure 12:
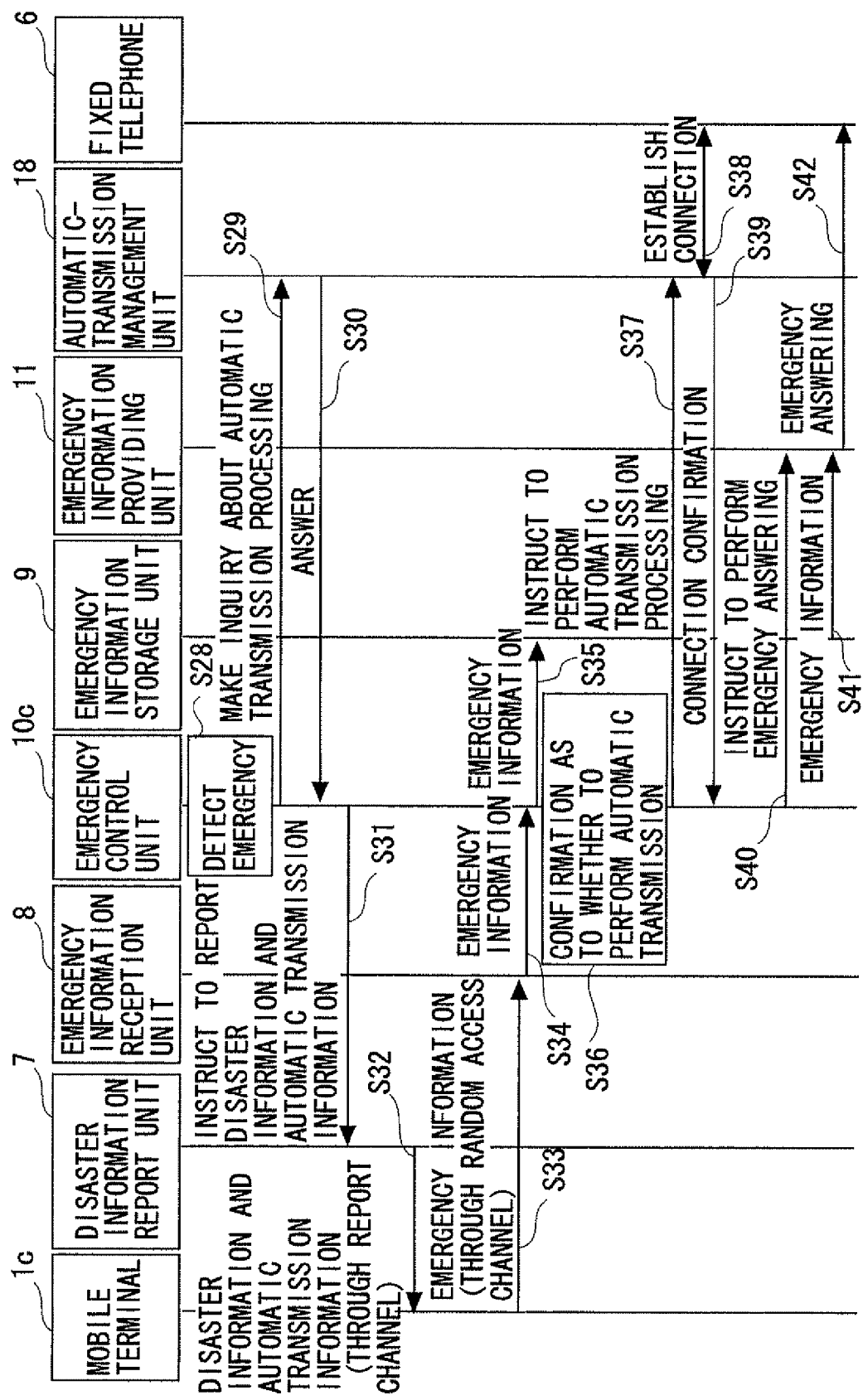
FIG. 12 is a diagram showing an operation sequence example of the mobile communication system according to the third embodiment.

FIG. 12 is a diagram showing an operation sequence example of the mobile communication system 100c. Next, a description is given of an operation sequence of the mobile communication system 100c. Upon detection of emergency (S28), the emergency control unit 10c makes an inquiry to the automatic-transmission management unit 18 whether automatic transmission processing is being performed (S29). The automatic-transmission management unit 18 gives an answer to the inquiry as to whether automatic transmission processing is being performed (S30). When the automatic-transmission management unit 18 is performing automatic transmission processing, the emergency control unit 10c instructs the disaster information report unit 7 to report automatic transmission information along with disaster information (S31). According to the instruction, the disaster information report unit 7 reports disaster information and automatic transmission information to each of the mobile terminals 1c through the report channel (S32).

Figure 13:
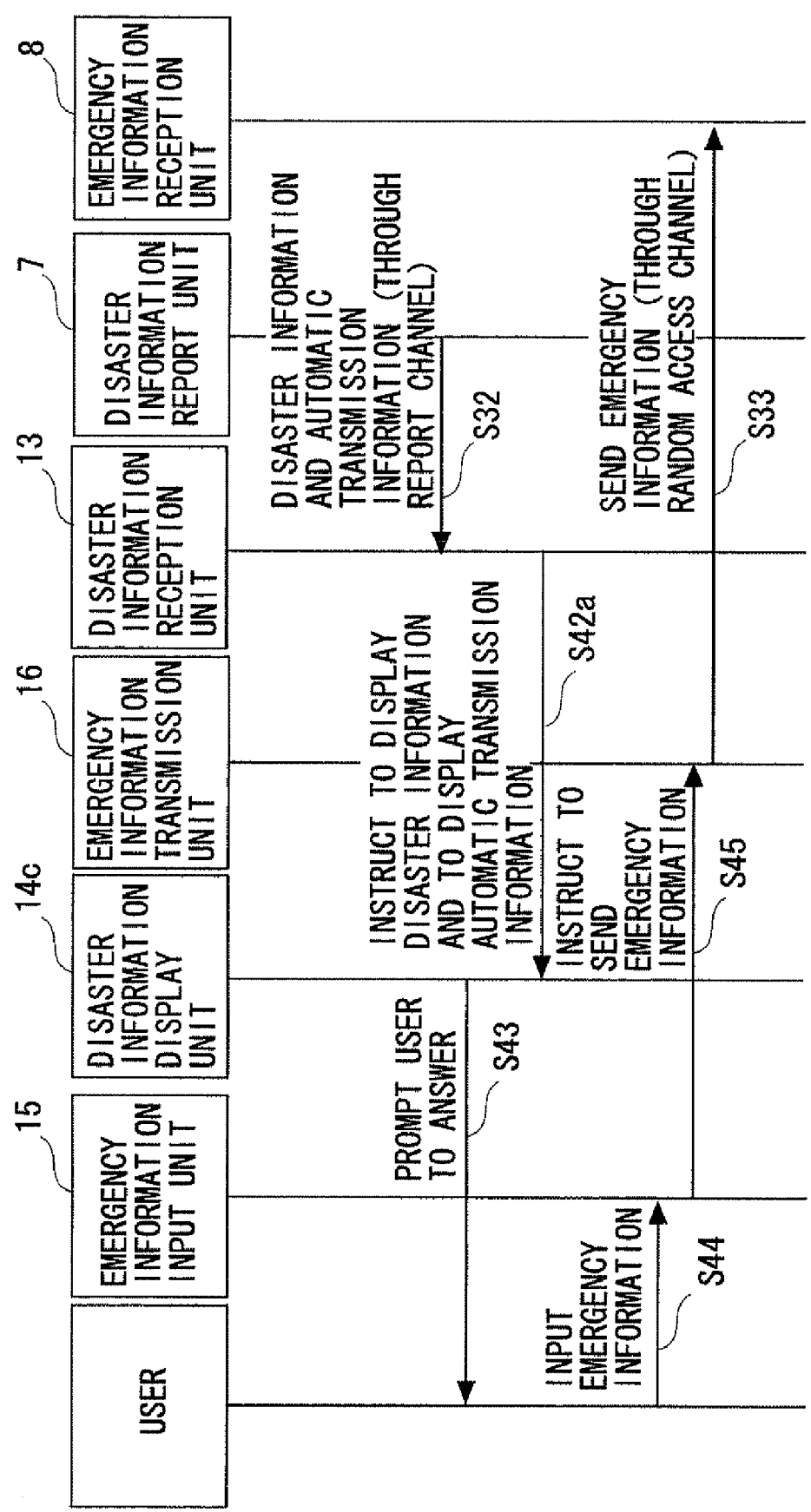
FIG. 13 is a diagram showing an operation example of the mobile terminal according to the third embodiment.
Figure 14:
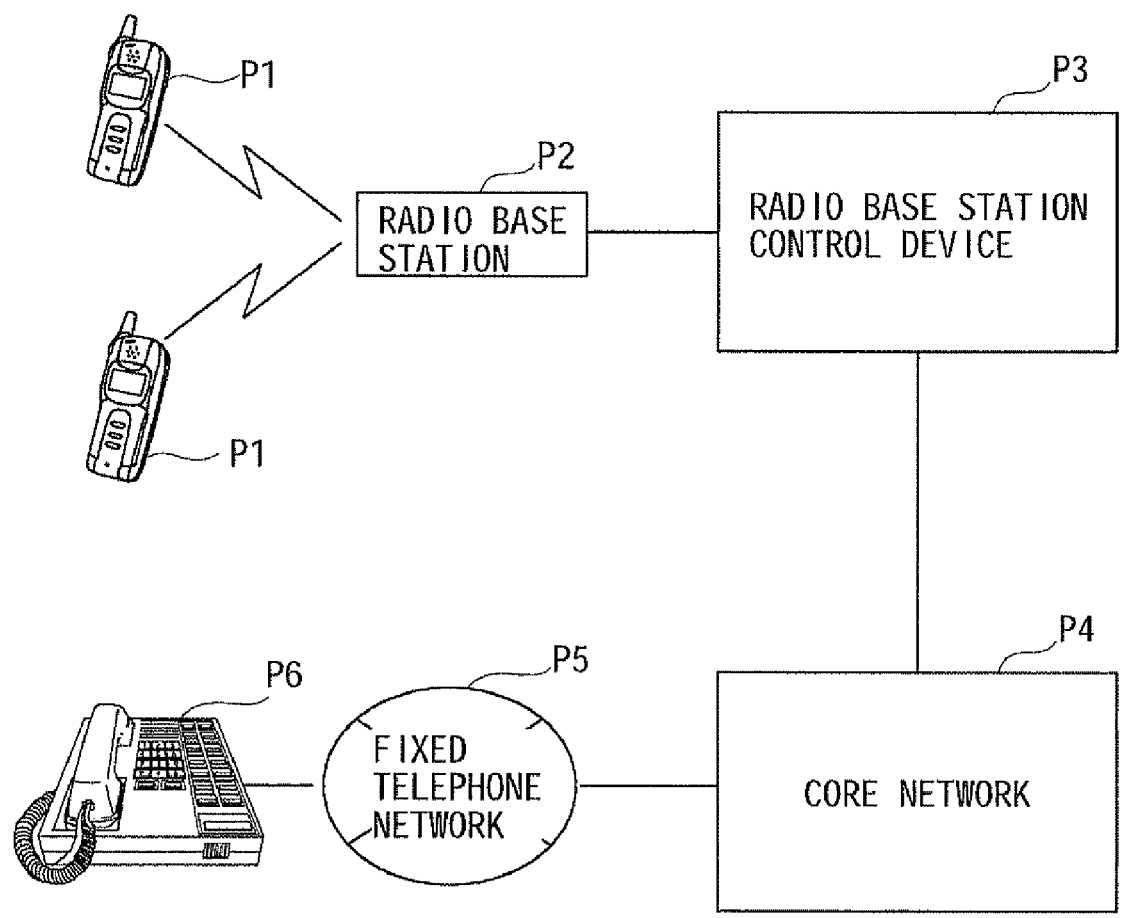
FIG. 14 is a diagram showing a configuration example of a conventional mobile communication system.

FIG. 13 is a diagram showing an operation example of the mobile terminal 1c performed when disaster information and automatic transmission information are received. After the disaster information and the automatic transmission information are reported by the disaster information report unit 7 through the report channel, the disaster information reception unit 13 of the mobile terminal 1c receives the two pieces of information. After the disaster information and the automatic transmission information are received by the disaster information reception unit 13, the emergency control unit 12c instructs the disaster information display unit 14c to display messages corresponding to the received disaster information and automatic transmission information (S42a). According to the instruction, the disaster information display unit 14c displays messages corresponding to the received disaster information and automatic transmission information, as shown in FIG. 11, for example, to prompt the user to input emergency information (S43). After viewing the message based on the disaster information, the user of the mobile terminal 1c learns that network congestion may prevent a phone call using the mobile terminal 1c from being connected. In other words, the user of the mobile terminal 1c learns that even when the user's family, friends, or acquaintances have made calls to the user, the mobile terminal 1c of the user may have been unable to receive the calls. When the user of the mobile terminal 1c wishes to tell those people at least that the user is safe, the user inputs emergency information by using the emergency information input unit 15 (S44). At this time, the user inputs emergency information, decides whether to perform automatic transmission, and, when automatic transmission is decided, inputs the identifier of the fixed telephone 6 serving as the answer destination (S44). For example, after reading the message (see FIG. 11) corresponding to the disaster information, the user of the mobile terminal 1c can press the button corresponding to "Yes" at the upper part and input a message serving as emergency information. In addition, the user of the mobile terminal 1c can press the button corresponding to "Yes" at the lower part and further select a desired automatic transmission destination or input the identifier of a desired automatic transmission destination.

After the emergency information and the automatic transmission destination are input via the emergency information input unit 15, the emergency control unit 12c instructs the emergency information transmission unit 16 to incorporate the identifier of the automatic transmission destination into the emergency information and to send the emergency information to the emergency information reception unit 8 (S45). According to the instruction, the emergency information transmission unit 16 sends the emergency information input by the user to the emergency information reception unit 8 through the random access channel (S33).

Referring back to FIG. 12, upon reception of the emergency information from the mobile terminal 1c through the random access channel (S33), the emergency information reception unit 8 sends the emergency information and the identifier of the mobile terminal 1c which has sent the emergency information, to the emergency control unit 10c of the core network 4c (S34). Upon reception of the emergency information, the emergency control unit 10c causes the emergency information storage unit 9 to store the received emergency information together with the identifier of the mobile terminal 1c, the reception time, and the identifier of the automatic transmission destination (S35).

Next, the emergency control unit 10c notifies the automatic-transmission management unit 18 of the identifier of the automatic transmission destination and instructs the automatic-transmission management unit 18 to perform automatic transmission processing (S37). Upon reception of the instruction, the automatic-transmission management unit 18 performs automatic transmission processing for the fixed telephone 6 corresponding to the notified automatic transmission destination and establishes a connection thereto (S38). When the connection to the fixed telephone 6 has been established, the automatic-transmission management unit 18 notifies the emergency control unit 10c that the connection to the fixed telephone 6 has been established, by sending connection confirmation (S39).

Upon reception of the connection confirmation from the automatic-transmission management unit 18, the emergency control unit 10c instructs the emergency information providing unit 11 to perform emergency answering for the fixed telephone 6 by using the emergency information that is a processing target (S40). The emergency information providing unit 11 reads the emergency information that is a processing target from the emergency information storage unit 9 (S41). Then, the emergency information providing unit 11 provides the read emergency information to the fixed telephone 6 (S42). At this time, the emergency information providing unit 11 may provide the identifier of the mobile terminal 1c which has sent the emergency information, the user name (such as the name of the person who has been registered as an owner of the mobile terminal 1c), and the like as well as the emergency information. For example, the emergency information providing unit 11 may provide the emergency information by voice. When the fixed telephone 6 has a function of receiving character information sent from the core network 4c, the emergency information may be provided in the form of character information to be displayed on the display of the fixed telephone 6. The emergency information may be provided after a message of "The following message is left at the date and time (hh:mm, MM DD, YY) by Mr./Ms. XXX," for example. Further, only such a message may be provided to the fixed telephone 6.

(Operation and Effect)

In the mobile communication systems 100a and 100b, emergency information registered by the mobile terminals 1a and 1b is not provided to the fixed telephone 6 unless the fixed telephone 6 makes a call. In other words, even when there is a message for the user of the fixed telephone 6, the user of the mobile terminals 1a and 1b cannot voluntarily notify the message to the user of the fixed telephone 6. In the mobile communication system 100c, such an issue is settled by implementing automatic transmission processing. When the identifier of a fixed telephone 6 serving as the automatic transmission destination is registered by the mobile terminal 1c together with emergency information, the automatic-transmission management unit 18 establishes a connection to the registered automatic transmission destination. Using the connection, the emergency information providing unit 11 notifies the fixed telephone 6 of the emergency information. Accordingly, even when the family, relatives, and acquaintances of the user of the mobile terminal 1c have not made a call from a fixed telephone 6, it is possible for the user of the mobile terminal 1c in a disaster area to notify them of information on the safety of the user.

(Modifications)

Through the first to third embodiments, the descriptions have been made on the assumption that the notification destination of emergency information is the fixed telephone 6 connected through the fixed telephone network 5, but a notification destination other than the fixed telephone 6 may be provided. For example, a mobile terminal (such as a cellular phone or a PHS terminal) may be provided as a notification destination of emergency information. In this case, particular change is no need for the radio base station control device 3 and the core network 4 (4a to 4c).

The automatic-transmission management unit 18 may be configured to store, in a storage device (not shown), the identifier of the fixed telephone 6 serving as a target of automatic transmission and the identifier of the mobile terminal 1c in association with each other. In this case, according to a request issued from mobile terminal 1c (for example, the same processing as a registration request performed in the mobile communication system 100b), the identifier of the mobile terminal 1c and the identifier of the fixed telephone 6 are stored in association with each other. In this case, when emergency information is sent from the mobile terminal 1c, the automatic-transmission management unit 18 performs automatic transmission processing for the fixed telephone 6 indicated by the identifier which has been associated with the identifier of the mobile terminal 1c and stored.

When cancellation of the registration of a fixed telephone 6 serving as the automatic transmission destination of emergency information is input via the emergency information input unit 15, the emergency control unit 12c may instruct the emergency information transmission unit 16 to send a cancellation request to cancel the registration of the fixed telephone 6, to the emergency information reception unit 8. In this case, the emergency information reception unit 8 sends, to the core network 4c, the cancellation request and the identifier of the mobile terminal 1c which has sent the cancellation request. Then, the emergency control unit 10c instructs the automatic-transmission management unit 18 to delete the association between the identifier of the fixed telephone 6 included in the cancellation request and the identifier of the mobile terminal 1c which has sent the cancellation request.

Effects can be obtained when the present invention is applied to a mobile communication system for cellular phones, PHS terminals, and the like.

[Others]

The disclosures of international application PCT/JP2005/008213 filed on Apr. 28, 2005 including the specification, drawings and abstract are incorporated herein by reference.

What is claimed is:

1. A mobile communication system, comprising:
   a reception unit to receive data from a mobile terminal having a phone call function via a common channel being a communication channel shared within a plurality of mobile terminals;
   a storage unit to store the data received by the reception unit and an identifier of the mobile terminal serving as a transmission source of the data in association with each other;
   an answer unit to read, when a phone call device having a phone call function makes a call to the mobile terminal, the data stored by the storage unit in association with the identifier of the mobile terminal serving as a call destination to send a response based on the data to the phone call device;
   an allocation unit to allocate a dedicated channel which is a dedicated communication channel to the mobile terminal; and
   a notification unit to notify, in a state where the dedicated channel cannot be allocated to the mobile terminal, notification indicating that the dedicated channel cannot be allocated to the mobile terminal, to the mobile terminal through the common channel,
   wherein the reception unit receives the data through the common channel from the mobile terminal to which the notification has been sent from the notification unit.

2. The mobile communication system according to claim 1, further comprising:
   a call connection establishment unit to establish, when the phone call device makes a call to the mobile terminal, a call connection between the mobile terminal and the phone call device; and
   a control unit to cause the answer unit to send the response, when the phone call device makes a call to the mobile terminal in the state where the dedicated channel cannot be allocated to the mobile terminal; and to cause the allocation unit to perform the allocation and further cause the call connection establishment unit to establish the call connection, when the phone call device makes a call to the mobile terminal in a state where the dedicated channel can be allocated to the mobile terminal.

3. The mobile communication system according to claim 1, further comprising a notification destination storage unit to store an identifier indicating the mobile terminal and an identifier indicating the phone call device in association with each other,
   wherein the answer unit sends the response, only when the identifier indicating the phone call device, serving as the call source, has been stored by the notification destination storage unit in association with an identifier indicating a terminal device serving as the call destination.

4. The mobile communication system according to claim 3, wherein:
   the notification destination storage unit stores the identifier indicating the mobile terminal, the identifier indicating the phone call device, and an identifier indicating the data to be stored by the storage unit in association with each other; and
   the answer unit sends, only when the identifier indicating the phone call device serving as the call source has been stored by the notification destination storage unit in association with the identifier indicating the mobile device serving as the call destination and the identifier indicating the data to be stored by the storage unit, the response by using the data indicated by the identifiers stored in association with each other.

5. The mobile communication system according to claim 4, wherein, the notification destination storage unit stores, when an identifier indicating a desired phone call device is received along with the data from the mobile terminal, the identifier indicating the mobile terminal, the received identifier indicating the phone call device, and the identifier indicating the received data in association with each other.

6. The mobile communication system according to claim 3, wherein, the notification destination storage unit stores, when a registration request is received along with an identifier indicating a desired phone call device from the mobile terminal, the identifier indicating the mobile terminal and the received identifier indicating the phone call device in association with each other.

7. The mobile communication system according to claim 3, wherein, the notification destination storage unit stores, when an identifier indicating a desired phone call device is received along with the data from the mobile terminal, the identifier indicating the mobile terminal and the received identifier indicating the phone call device in association with each other.

8. The mobile communication system according to claim 1, further comprising an automatic transmission unit to allow, when an instruction to actively send the response to the phone call device is received along with the data from the mobile terminal, the answer unit to send the response to the phone call device regardless of whether the phone call device has made a call or not,
   wherein the answer unit sends the response when the automatic transmission unit establishes a condition where the response is sent.

9. The mobile communication system according to claim 1, wherein:
   the mobile communication system comprises a radio base station for performing radio communication with the mobile terminal, a radio base station control device for controlling the radio base station, and a core network for connecting a radio network that includes the radio base station and the radio base station control device to another network so as to be able to perform communication;
   the radio base station comprises the reception unit;
   the storage unit and the answer unit are connected with each other in the core network; and the radio base station control device comprises a transmission unit that sends the data received by the reception unit to the storage unit of the core network.

10. A mobile terminal used in a mobile communication system, wherein the mobile communication system includes a reception unit to receive data from a mobile terminal having a phone call function via a common channel being a communication channel shared within a plurality of mobile terminals, a storage unit to store the data received by the reception unit and an identifier of the mobile terminal serving as the transmission source of the data in association with each other, an answer unit to read, when a phone call device having a phone call function makes a call to the mobile terminal, the data stored by the storage unit in association with the mobile terminal serving as the call destination to send a response based on the data to the phone call device, an allocation unit to allocate a dedicated channel which is a dedicated communication channel to the mobile terminal, and a notification unit to notify, in a state where the dedicated channel cannot be allocated to the mobile terminal, notification indicating that the dedicated channel cannot be allocated to the mobile terminal, to the mobile terminal through the common channel, the mobile terminal comprising:
- a receiving unit to receive the notification notified by the notification unit through the common channel;
- a display unit to display an expression to prompt a user to input the desired message when the notification is received;
- an input unit to allow, when the display unit displays the expression to prompt the user to input the desired message, the user to input the desired message; and
- a transmission unit to send the data generated by the input unit to the reception unit of the mobile communication system through the common channel.

11. The mobile terminal used in a mobile communication system according to claim 10, wherein the mobile communication system further includes an automatic transmission unit to allow, when an instruction to actively perform the answering for the phone call device is received along with the data from the mobile terminal, the answer unit to send the response to the phone call device regardless of whether the phone call device has made a call or not, the answer unit performing the answering when the automatic transmission unit establishes a condition where the answering can be performed,
wherein: the display unit further displays an expression to prompt the user to specify a phone call device for which the answering is actively performed;
the input unit allows the user to specify the phone call device when the display unit displays the expression to prompt the user to specify the phone call device; and
the transmission unit sends the identifier of the phone call device along with the data.

12. A method of controlling communications by an information processor used in a mobile communication system, the method comprising:
receiving data from a mobile terminal having a phone call function via a common channel being a communication channel shared within a plurality of mobile terminals;
storing the received data and an identifier of the mobile terminal serving as a transmission source of the data in association with each other in a storage device used in the mobile communication system;
reading, when a phone call device having a phone call function makes a call to the mobile terminal, the data stored in the storage device in association with the identifier of the mobile terminal serving as a call destination to send a response based on the data to the phone call device;
trying to allocate a dedicated channel which is a dedicated communication channel to the mobile terminal; and
notifying, in a state where the dedicated channel cannot be allocated to the mobile terminal, notification indicating that the dedicated channel cannot be allocated to the mobile terminal, to the mobile terminal through the common channel,
wherein the receiving receives the data through the common channel from the mobile terminal to which the notification has been sent.

13. A computer-readable medium storing a program, which when executed by an information processor used in a mobile communication system, makes the information processor perform a method for controlling communications comprising instructions of:
receiving data from a mobile terminal having a phone call function via a common channel being a communication channel shared within a plurality of mobile terminals;
storing the received data and an identifier of the mobile terminal serving as a transmission source of the data in association with each other in a storage device used in the mobile communication system;
reading, when a phone call device having a phone call function makes a call to the mobile terminal, the data stored in the storage device in association with the identifier of the mobile terminal serving as a call destination to send a response based on the data to the phone call device;
trying to allocate a dedicated channel which is a dedicated communication channel to the mobile terminal; and
notifying, in a state where the dedicated channel cannot be allocated to the mobile terminal, notification indicating that the dedicated channel cannot be allocated to the mobile terminal, to the mobile terminal through the common channel,
wherein the receiving receives the data through the common channel from the mobile terminal to which the notification has been sent.

* * * * *